(12) United States Patent
Fukunaga et al.

(10) Patent No.: US 12,288,869 B2
(45) Date of Patent: Apr. 29, 2025

(54) METHOD OF MANUFACTURING FORMED BODY FOR ELECTRODE

(71) Applicant: FUJIFILM CORPORATION, Tokyo (JP)

(72) Inventors: Akihito Fukunaga, Kanagawa (JP); Eijiro Iwase, Kanagawa (JP); Koji Tonohara, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 792 days.

(21) Appl. No.: 17/563,093

(22) Filed: Dec. 28, 2021

(65) Prior Publication Data
US 2022/0123280 A1   Apr. 21, 2022

Related U.S. Application Data

(63) Continuation of application No. PCT/JP2020/031154, filed on Aug. 18, 2020.

(30) Foreign Application Priority Data

Aug. 19, 2019 (JP) .................................. 2019-149870

(51) Int. Cl.
*H01M 4/139*      (2010.01)
*H01M 4/1391*    (2010.01)
(Continued)

(52) U.S. Cl.
CPC ..... *H01M 4/1391* (2013.01); *H01M 10/0525* (2013.01); *H01M 10/0585* (2013.01)

(58) Field of Classification Search
CPC .......... H01M 4/1391; H01M 10/0585; H01M 4/0404; H01M 4/0435; H01M 4/139; Y02P 70/50; Y10T 29/49108; Y10T 29/49147
See application file for complete search history.

(56) References Cited

U.S. PATENT DOCUMENTS 5,151,377 A * 9/1992 Hanoka ................ H05K 3/1241
                                                         438/674
8,846,439 B2 * 9/2014 Ushifusa .................. G03F 7/12
                                                          438/98
(Continued)

FOREIGN PATENT DOCUMENTS

CN    105436015 A    3/2016
CN    106898769 A    6/2017
(Continued)

OTHER PUBLICATIONS

English language translation of the following: Office action dated Feb. 8, 2024 from the SIPO in a Chinese patent application No. 202080051569.4 corresponding to the instant patent application. This office action translation is submitted now in order to supplement the understanding of the cited reference which is being disclosed in the instant Information Disclosure Statement.
(Continued)

*Primary Examiner* — Donghai D Nguyen
(74) *Attorney, Agent, or Firm* — SOLARIS Intellectual Property Group, PLLC

(57) ABSTRACT

A method of manufacturing a formed body for an electrode including: a step of jetting an electrode material containing an electrode active material from an outlet toward a surface $F_A$ of a first support while relatively moving the outlet jetting the electrode material and the first support in a plane direction of the first support, in which in the step, a contact member having a contact surface $F_B$ that is brought into contact with the electrode material is used, and in a case
(Continued)

where a wall friction angle between the contact surface $F_B$ of the contact member and the electrode material is denoted by θ1, and a wall friction angle between the surface $F_A$ of the first support and the electrode material is denoted by θ2, a relationship (1) 1°≤θ1<15° and a relationship (2) 15°≤θ2 are satisfied.

12 Claims, 1 Drawing Sheet

(51) Int. Cl.
    *H01M 10/0525*    (2010.01)
    *H01M 10/0585*    (2010.01)

(56) References Cited

U.S. PATENT DOCUMENTS

| | | | |
|---|---|---|---|
| 10,084,179 B2 * | 9/2018 | Tanihara | H01M 4/0435 |
| 10,396,350 B2 * | 8/2019 | Hosono | H01M 4/0469 |
| 2016/0082467 A1 | 3/2016 | Mikami et al. | |
| 2018/0277901 A1 | 9/2018 | Mochizuki et al. | |

FOREIGN PATENT DOCUMENTS

| | | |
|---|---|---|
| EP | 3244470 A1 | 11/2017 |
| EP | 3982438 A1 | 4/2022 |
| JP | H09-106816 A | 4/1997 |
| JP | H09-245776 A | 9/1997 |
| JP | 2002-231231 A | 8/2002 |
| JP | 2007-5747 A | 1/2007 |
| JP | 2013-114847 A | 6/2013 |
| JP | 2015-28910 A | 2/2015 |
| JP | 2020-146625 A | 9/2020 |
| WO | 2017/104405 A1 | 6/2017 |

OTHER PUBLICATIONS

English language translation of the following: Office action dated Aug. 23, 2022 from the JPO in a Japanese patent application No. 2021-540952 corresponding to the instant patent application.
Extended European Search Report dated Feb. 24, 2023, issued in corresponding EP Patent Application No. 20854591.3.
International Search Report issued in International Application No. PCT/JP2020/031154 on Oct. 20, 2020.
Written Opinion of the ISA issued in International Application No. PCT/JP2020/031154 on Oct. 20, 2020.

* cited by examiner

METHOD OF MANUFACTURING FORMED BODY FOR ELECTRODE

CROSS-REFERENCE TO RELATED APPLICATIONS

This application is a continuation application of International Application No. PCT/JP220/031154, filed Aug. 18, 2020, the disclosure of which is incorporated herein by reference in its entirety. Further, this application claims priority from Japanese Patent Application No. 2019-149870, filed Aug. 19, 2019, the disclosure of which is incorporated herein by reference in its entirety.

BACKGROUND OF THE INVENTION

1. Field of the Invention

The present disclosure relates to a method of manufacturing a formed body for an electrode.

2. Description of the Related Art

An electrolytic solution is usually used as an electrolyte contained in a battery such as a lithium ion battery. In recent years, from the viewpoint of safety (for example, prevention of liquid leakage), the development of an all-solid state battery that replaces an electrolytic solution with a solid electrolyte has been considered.

In the manufacturing of an electrode to be applied to the battery described above, a coating liquid containing an electrode material such as an active material and a solvent is usually used (for example, WO2017/104405A).

It has been known that in a method of manufacturing a lithium ion battery, a lithium ion battery powder supply method of supplying a powder housed in a hopper from a powder supply port formed at a tip of a powder supply tube, including a press step of transporting and pressing the powder in the powder supply tube in a direction toward the powder supply port by using a traveling wave to fill the powder with a predetermined density, and a supply step of supplying the powder, filled with a predetermined density in the vicinity of the powder supply port, from the powder supply port to the supply object is used (for example, see JP2015-028910A).

In addition, as a method of manufacturing a sheet for an electrochemical element electrode that is suitably used for a lithium ion secondary battery, a method of manufacturing a sheet for an electrochemical element electrode, including the steps of: supplying, by a fixed quantity feeder, an electrode material to a belt or a pair of pressing rolls arranged nearly horizontally; and forming the electrode material into a sheet-shaped formed body by the belt or the pressing rolls has been known (for example, see JP2007-005747A).

SUMMARY OF THE INVENTION

In the method of forming an electrode using a coating liquid (for example, the method described in WO2017/104405A), it is usually necessary to dry the coating liquid. In a case where the drying is not sufficiently performed, the solvent may remain in the electrode, and the battery performance (for example, discharge capacity and output characteristics) may thus be reduced. In particular, in an all-solid state battery, the amount of the solvent remaining in the electrode is preferably small.

Therefore, for example, the methods of manufacturing an electrode using a powder, described in JP2015-028910A and JP2007-005747A, have been proposed.

In JP2015-028910A and JP2007-005747A, members (hopper, pressing roll, belt, etc.) that are brought into contact with the powder during the manufacturing of the electrode are used, and in a case where the powder adheres to these members, transportability, formability, and the like of the powder are locally reduced, and an electrode having a large in-plane variation in mass distribution may be manufactured.

Accordingly, the present disclosure is contrived in view of the above circumstances.

An object of an embodiment of the present disclosure is to provide a method of manufacturing a formed body for an electrode, in which a formed body for an electrode that is excellent in in-plane uniformity of a mass distribution can be manufactured.

The present disclosure includes the following embodiments.

<1> A method of manufacturing a formed body for an electrode including: a step of jetting an electrode material containing an electrode active material from an outlet toward a surface $F_A$ of a first support while relatively moving the outlet jetting the electrode material and the first support in a plane direction of the first support, in which in the step, a contact member having a contact surface $F_B$ that is brought into contact with the electrode material is used, and in a case where a wall friction angle between the contact surface $F_B$ of the contact member and the electrode material is denoted by θ1, and a wall friction angle between the surface $F_A$ of the first support and the electrode material is denoted by θ2, the following relationships (1) and (2) are satisfied.

$$1°≤θ1<15° \tag{1}$$

$$15°≤θ2 \tag{2}$$

<2> The method of manufacturing a formed body for an electrode according to <1>, in which the wall friction angles θ1 and θ2 satisfy the following relationship (3).

$$1°≤θ2-θ1≤60° \tag{3}$$

<3> The method of manufacturing a formed body for an electrode according to <1> or <2>, in which the wall friction angle θ2 satisfies the following relationship (2').

$$15°≤θ2≤60° \tag{2'}$$

<4> The method of manufacturing a formed body for an electrode according to any one of <1> to <3>, in which the contact member is a storage member that has a discharge port as the outlet and is capable of storing the electrode material, and an inner peripheral surface of the discharge port is the contact surface $F_B$ of the contact member.

<5> The method of manufacturing a formed body for an electrode according to any one of <1> to <3>, in which the contact member is a roll member, and an outer peripheral surface of the roll member is the contact surface $F_B$ of the contact member.

<6> The method of manufacturing a formed body for an electrode according to any one of <1> to <3>, in which the contact member is a long second support that constitutes a part of the outlet and is moved while being brought into contact with the jetted electrode material, and a contact surface of the second support that is brought into contact with the electrode material is the contact surface $F_B$ of the contact member.

<7> The method of manufacturing a formed body for an electrode according to any one of <1> to <6>, in which the contact surface $F_B$ of the contact member has a contact angle of 75° or more with water.

<8> The method of manufacturing a formed body for an electrode according to any one of <1> to <7>, in which the surface $F_A$ of the first support has a contact angle of 30° or more and less than 75° with water.

<9> The method of manufacturing a formed body for an electrode according to any one of <1> to <8>, in which the contact surface $F_B$ of the contact member has a surface layer containing at least one of a fluorine atom or a silicon atom.

<10> The method of manufacturing a formed body for an electrode according to <9>, in which the surface layer further contains an antistatic agent.

<11> The method of manufacturing a formed body for an electrode according to any one of <1> to <10>, in which the contact surface $F_B$ of the contact member has an arithmetic average roughness Ra of 10 μm or less.

<12> The method of manufacturing a formed body for an electrode according to any one of <1> to <11>, in which the first support is a release material.

According to an embodiment of the present disclosure, it is possible to provide a method of manufacturing a formed body for an electrode, in which a formed body for an electrode that is excellent in in-plane uniformity of a mass distribution can be manufactured.

DESCRIPTION OF THE PREFERRED EMBODIMENTS

Figure 1:
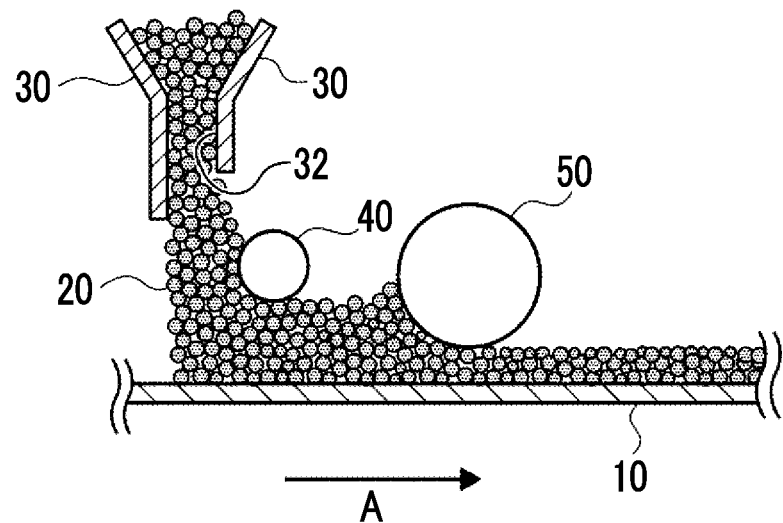
FIG. 1 is a schematic diagram illustrating an embodiment of an electrode material jetting step in a method of manufacturing a formed body for an electrode according to the present disclosure.

Hereinafter, embodiments of the present disclosure will be described with reference to the drawings. The present disclosure is not limited to the following embodiments, and may be implemented with appropriate changes within the scope of the object of the present disclosure. The constituent elements denoted by using the same references in the drawings mean that these are the same constituent elements. Descriptions of the overlapping constituent elements and references in the drawings may be omitted. The dimensional ratios in the drawings do not necessarily represent the actual dimensional ratio.

In the present disclosure, a numerical range expressed using "to" means a range including numerical values before and after "to" as a lower limit and an upper limit. In numerical ranges described in a stepwise manner in the present disclosure, an upper limit or a lower limit described in a certain numerical range may be substituted with an upper limit or a lower limit of another numerical range described in a stepwise manner. Furthermore, in a numerical range described in the present disclosure, an upper limit or a lower limit described in a certain numerical range may be substituted with a value shown in an example.

In the present disclosure, the term "step" includes not only an independent step but also cases where it cannot be clearly distinguished from other steps, so long as the desired effect of the step can be achieved.

In the present disclosure, "(meth)acrylic" means acrylic and/or methacrylic.

In the present disclosure, regarding the amount of each component in a composition, in a case where there are a plurality of substances corresponding to the component in the composition, the amount means a total amount of the plurality of substances present in the composition, unless otherwise specified.

In the present disclosure, "mass %" and "wt %" are synonymous, and "parts by mass" and "parts by weight" are synonymous.

In the present disclosure, a combination of two or more preferable aspects is a more preferable aspect.

In the present disclosure, the "solid content" means a component which does not disappear by volatilization or evaporation in a case where a drying treatment is performed on 1 g of a sample at 200° C. for 6 hours under a nitrogen atmosphere.

<Method of Manufacturing Formed Body for Electrode>

A method of manufacturing a formed body for an electrode according to the present disclosure includes a step of jetting an electrode material containing an electrode active material from an outlet toward a surface $F_A$ of a first support while relatively moving the outlet jetting the electrode material and the first support in a plane direction of the first support (hereinafter, also referred to as "electrode material jetting step"), in the step, a contact member having a contact surface $F_B$ that is brought into contact with the electrode material interposed between the first support and the contact member is used, and in a case where a wall friction angle between the contact surface $F_B$ of the contact member and the electrode material is denoted by θ1, and a wall friction angle between the surface $F_A$ of the first support and the electrode material is denoted by θ2, the following relationships (1) and (2) are satisfied.

$$1° \leq θ1 < 15° \quad (1)$$

$$15° \leq θ2 \quad (2)$$

Here, the electrode material jetting step refers to a step during the movement of the electrode material jetted from the outlet toward the first support.

In the method of manufacturing a formed body for an electrode according to the present disclosure, a formed body for an electrode that is excellent in in-plane uniformity of a mass distribution can be manufactured. The reason why the method of manufacturing a formed body for an electrode according to the present disclosure produces the above effect is presumed as follows.

The method of manufacturing a formed body for an electrode according to the present disclosure includes the step of jetting an electrode material containing an electrode active material from an outlet toward a surface of a first support while relatively moving the outlet jetting the electrode material and the first support in a plane direction of the first support. In this step, the contact member having a contact surface that is brought into contact with the electrode material interposed between the first support and the contact member is used.

In the above step, the three elements, that is, the first support, the electrode material, and the contact member form a configuration in which the electrode material is interposed between the first support and the contact member.

Since the contact member is a member that is brought into contact with the electrode material during the movement of the electrode material jetted from the outlet toward the first support, it is desirable that the contact surface brought into contact with the electrode material has low affinity for the electrode material and excellent releasability.

However, even in a case where the contact surface of the contact member that is brought into contact with the electrode material has releasability, the electrode material is not always uniformly placed on the first support.

Accordingly, the inventors have conducted studies, and found that in a case where a specific relationship is provided by wall friction angles between the three elements in the configuration in which the electrode material is interposed between the first support and the contact member, it is possible to manufacture a formed body for an electrode that is excellent in in-plane uniformity of a mass distribution.

That is, it has been found that in a case where a wall friction angle $\theta 1$ between a contact surface $F_B$ of the contact member that is brought into contact with the electrode material and the electrode material and a wall friction angle $\theta 2$ between a surface $F_A$ of the first support and the electrode material satisfy the above relationships (1) and (2), it is possible to manufacture a formed body for an electrode that is excellent in in-plane uniformity of a mass distribution.

In a case where the above (1) and (2) are satisfied, the electrode material rarely adheres to the contact surface $F_B$ of the contact member that is brought into contact with the electrode material, while easily adhering to the surface $F_A$ of the first support. Therefore, it is presumed that the electrode material jetted toward the surface of the first support does not adhere to the contact member, moves smoothly, and is supplied to the first support. As a result, it is presumed that a target amount of the electrode material is sequentially supplied onto the first support, and a formed body for an electrode that is excellent in in-plane uniformity of a mass distribution is manufactured.

In addition, in a case where the electrode material adheres to the contact surface of the contact member that is brought into contact with the electrode material, an operation for removing the electrode material is required, and this operation also causes a decrease in productivity.

In contrast, in the method of manufacturing a formed body for an electrode according to the present disclosure, since the electrode material rarely adheres to the contact surface of the contact member that is brought into contact with the electrode material, it is thought that no operation for removing the electrode material is required, and the productivity is also increased.

The method of manufacturing a formed body for an electrode according to the present disclosure may further optionally have, in addition to the electrode material jetting step, a step of preparing an electrode material (also referred to as an electrode material preparation step), a step of forming the electrode material (also referred to as an electrode material forming step), and the like.

Hereinafter, the steps of the method of manufacturing a formed body for an electrode according to the present disclosure will be described.

[Electrode Material Jetting Step]

The electrode material jetting step is a step of jetting an electrode material containing an electrode active material from the outlet toward the surface $F_A$ of the first support while relatively moving the outlet jetting the electrode material and the first support in a plane direction of the first support.

The electrode material containing the electrode active material used in this step is a powder or a mixture of a powder and a small amount of a liquid component, and the electrode material jetting step is a step of jetting a powder or a mixture of a powder and a small amount of a liquid component onto the first support.

Here, details of the electrode material containing the electrode active material will be described later.

In the electrode material jetting step, the contact member having the contact surface $F_B$ that is brought into contact with the electrode material interposed between the first support and the contact member is used. In addition, in a case where a wall friction angle between the contact surface $F_B$ of the contact member and the electrode material is denoted by $\theta 1$, and a wall friction angle between the surface $F_A$ of the first support and the electrode material is denoted by $\theta 2$, the following relationships (1) and (2) are satisfied.

$$1° \leq \theta 1 < 15° \tag{1}$$

$$15° \leq \theta 2 \tag{2}$$

The wall friction angles $\theta 1$ and $\theta 2$ are physical property values indicating the frictional resistance between the surface of the object and the electrode material layer. The larger the wall friction angle, the higher the frictional resistance, and the smaller the wall friction angle, the lower the frictional resistance.

Examples of the method of measuring the wall friction angles $\theta 1$ and $\theta 2$ include the measurement in which a force is applied in a shearing direction between the surface of the object and the electrode material layer that is in a compacted state by application of a vertical load, and the flowing force of the electrode material layer at that time is obtained.

Specifically, the wall friction angles $\theta 1$ and $\theta 2$ are measured using a powder fluidity measuring device VOLUTION (Volution Powder Flow Tester, VFT).

In a case where the surface of the measurement object cannot be applied to the above device as it is, only the surface of the measurement object may be taken out, or a measurement sample having the same composition and surface properties as the surface of the measurement object may be prepared and used.

In the electrode material jetting step, the above (1) is specified from the viewpoint of easily applying a pressure to the electrode material and from the viewpoint of increasing the releasability of the electrode material, and from the same viewpoints, $\theta 1$ is preferably 1° or more and 15° or less, and more preferably 3° or more and 13° or less.

In the electrode material jetting step, the above (2) is specified from the viewpoint of easily placing the electrode material on the first support, and from the same viewpoint and from the viewpoint of making it possible to release the electrode material from the first support as necessary, $\theta 2$ is preferably 15° or more and 60° or less, and more preferably 16° or more and 55° or less.

That is, in the electrode material jetting step, the wall friction angles $\theta 1$ and $\theta 2$ preferably satisfy the following relationship (2').

$$15° \leq \theta 2 \leq 60° \tag{2'}$$

In the electrode material jetting step, the wall friction angles $\theta 1$ and $\theta 2$ satisfy the following relationship (3) from the viewpoint of further increasing the in-plane uniformity of a mass distribution.

$$1° \leq \theta2-\theta1 \leq 60° \quad (3)$$

In particular, θ2−θ1 is preferably 3° or more and 50° or less, and more preferably 5° or more and 40° or less from the viewpoint of further increasing the in-plane uniformity of a mass distribution.

Hereinafter, specific embodiments of the electrode material jetting step will be described with reference to the drawings.

Figure 2:
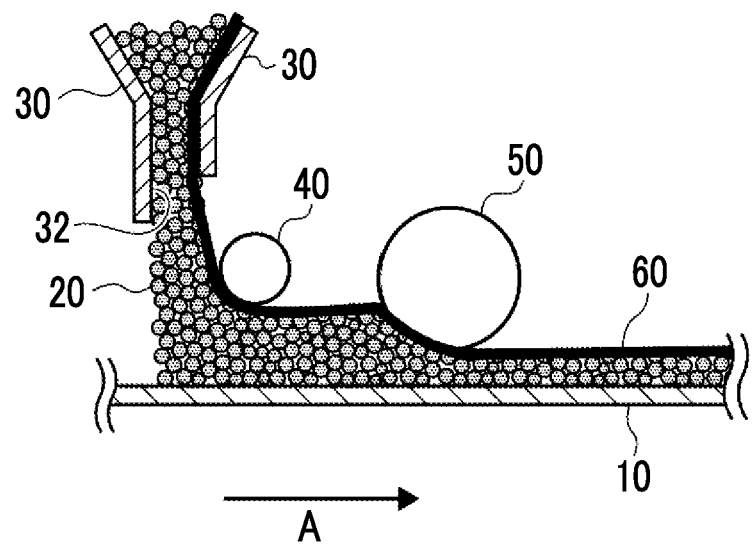
FIG. 2 is a schematic diagram illustrating another embodiment of the electrode material jetting step in the method of manufacturing a formed body for an electrode according to the present disclosure.

Here, FIG. 1 is a schematic diagram illustrating an embodiment (hereinafter, referred to as a first embodiment) of the electrode material jetting step in the method of manufacturing a formed body for an electrode according to the present disclosure. In addition, FIG. 2 is a schematic diagram illustrating another embodiment (hereinafter, referred to as a second embodiment) of the electrode material jetting step in the method of manufacturing a formed body for an electrode according to the present disclosure.

First Embodiment

In FIG. 1, an electrode material 20 stored in a hopper 30 is discharged from a discharge port 32 of the hopper 30, and supplied onto a support (an example of the first support) 10 that is being transported in a direction of the arrow A.

The support 10 is transported in the direction of the arrow A by a transport mechanism (not shown). Here, the discharge port (an example of the outlet for the electrode material) 32 of the hopper 30 and the support 10 may be relatively moved in a plane direction of the support 10, and other than an aspect in which the support 10 is moved, an aspect in which the hopper 30 is moved or an aspect in which both the support 10 and the hopper 30 are moved may be employed.

In order to uniformly apply the electrode material 20 onto the support 10, the aspect in which the support 10 is moved is preferable.

The above transport mechanism is not limited, and known transport units can be used. Examples thereof include a belt conveyor, a linear motion guide, and a cross roller table.

The amount (specifically, for example, the thickness of the layer of the electrode material 20), density distribution, and the like of the electrode material 20 discharged from the discharge port 32 of the hopper 30 are regulated by a regulating roll 40 shown in FIG. 1.

In addition, the electrode material 20 supplied onto the support 10 is moved with the transport of the support 10, and is pressurized by contact with a pressurizing roll 50 (corresponding to an electrode material forming step to be described later).

Here, both the hopper 30 and the regulating roll 40 are members that are brought into contact with the electrode material 20 during the movement of the electrode material 20 toward the support 10 as an example of the first support, and each corresponds to the "contact member" in the present disclosure.

The hopper 30 is a storage member that has the discharge port 32 discharging the electrode material 20 and is capable of storing the electrode material 20, and an inner peripheral surface of the discharge port 32 is a contact surface $F_B$ of the contact member.

In addition, the regulating roll 40 is a roll member, and an outer peripheral surface of the roll member is a contact surface $F_B$ of the contact member.

Therefore, in the first embodiment, in a case where a wall friction angle between the inner peripheral surface of the discharge port 32 of the hopper 30 and the electrode material 20 is denoted by $\theta1_{(30)}$ and a wall friction angle between the outer peripheral surface of the regulating roll 40 and the electrode material 20 is denoted by $\theta1_{(40)}$, at least one of $\theta1_{(30)}$ or $\theta1_{(40)}$ satisfies the above relationship (1), and both $\theta1_{(30)}$ and $\theta1_{(40)}$ preferably satisfy the above relationship (1).

In the first embodiment, in a case where at least one of $\theta1_{(30)}$ or $\theta1_{(40)}$ (preferably both) satisfies the above relationship (1), the electrode material 20 discharged from the discharge port 32 toward the support 10 does not adhere to the inner peripheral surface of the discharge port 32 of the hopper 30 and/or the outer peripheral surface of the regulating roll 40, moves smoothly, and is sequentially supplied to the support 10 that is being transported.

Accordingly, a target amount of the electrode material 20 is sequentially supplied onto the support 10, and as a result, it is presumed that a formed body for an electrode that is excellent in in-plane uniformity of a mass distribution can be manufactured.

From the viewpoint that the movement and discharge of the electrode material 20 stored in the hopper are not hindered, the hopper 30 is preferably designed so that not only the inner peripheral surface of the discharge port 32 but also many regions (preferably all regions) of the inner peripheral surface of the hopper 30 that is brought into contact with the electrode material 20 form a wall friction angle satisfying the above relationship (1) with the electrode material 20.

The pressurizing roll 50 in FIG. 1 is a member that is brought into contact with the electrode material 20 supplied onto the support 10 and pressurizes the electrode material 20.

Since it is preferable that the electrode material 20 does not adhere to the outer peripheral surface of the pressurizing roll 50 and moves together with the support 10, the design is preferably made so that the wall friction angle between the outer peripheral surface of the pressurizing roll 50 and the electrode material 20 also satisfy the relationship (1).

Second Embodiment

In FIG. 2, the electrode material 20 stored in the hopper 30 is discharged from the discharge port 32 of the hopper 30, and is supplied onto the support 10 that is being transported in the direction of the arrow A.

In this case, a long support (an example of the second support) 60 that is moved while being brought into contact with the electrode material 20 discharged from the discharge port 32 of the hopper 30 along a part of the inner peripheral surface of the hopper 30 and a part of the discharge port 32 of the hopper 30 is provided.

Unless otherwise specified, the second embodiment is the same as the first embodiment, except that the above support 60 is used, and preferable aspects are also the same. Therefore, details thereof will be omitted here.

Here, both the hopper 30 and the support 60 are members that are brought into contact with the electrode material 20 during the movement of the electrode material 20 toward the support (an example of the first support) 10, and each corresponds to the "contact member" in the present disclosure.

As in the first embodiment, in the hopper 30, the inner peripheral surface of the discharge port 32 discharging the electrode material 20 is a contact surface $F_B$ of the contact member.

In addition, the support 60 is a long second support that constitutes a part of the discharge port 32 discharging the electrode material 20 and is moved while being brought into contact with the discharged electrode material 20, and the contact surface of the support 60 as the second support that is brought into contact with the electrode material is a contact surface $F_B$ of the contact member.

Therefore, in the second embodiment, in a case where a wall friction angle between the inner peripheral surface of the discharge port 32 of the hopper 30 and the electrode material 20 is denoted by $\theta1_{(30)}$ and a wall friction angle between the contact surface of the support 60 that is brought into contact with the electrode material 20 and the electrode material 20 is denoted by $\theta1_{(60)}$, at least one of $\theta1_{(30)}$ or $\theta1_{(60)}$ satisfies the above relationship (1), and both $\theta1_{(30)}$ and $\theta1_{(60)}$ preferably satisfy the above relationship (1).

In the second embodiment, in a case where at least one of $\theta1_{(30)}$ or $\theta1_{(60)}$ (preferably both) satisfies the above relationship (1), the electrode material 20 discharged from the discharge port 32 toward the support 10 does not adhere to the inner peripheral surface of the discharge port 32 of the hopper 30 and/or the contact surface of the support 60 that is brought into contact with the electrode material 20, moves smoothly, and is sequentially supplied to the support 10 that is being transported.

Accordingly, a target amount of the electrode material 20 is sequentially supplied onto the support 10, and as a result, it is presumed that a formed body for an electrode that is excellent in in-plane uniformity of a mass distribution can be manufactured.

Here, in the second embodiment, the support 60 is moved while being brought into contact with the electrode material 20, and forms a state in which the electrode material 20 is sandwiched between the support 60 and the support 10.

Therefore, the regulating roll 40 shown in FIG. 2 regulates the amount (specifically, for example, the thickness of the layer of the electrode material 20) of the electrode material 20 via the support 60. As described above, since the regulating roll 40 in the second embodiment is not brought into contact with the electrode material 20, a wall friction angle $\theta1_{(40)}$ between the outer peripheral surface of the regulating roll 40 and the electrode material 20 is not required to satisfy the above relationship (1). The outer peripheral surface of the regulating roll 40 in the second embodiment may have surface properties useful for regulating the amount of the electrode material 20 via the support 60.

In addition, the pressurizing roll 50 shown in FIG. 2 also pressurizes the electrode material 20 via the support 60. The outer peripheral surface of the regulating roll 40 in the second embodiment may have surface properties useful for pressurizing the electrode material 20 via the support 60.

[Contact Surface $F_B$ and Surface $F_A$]

The contact surface $F_B$ of the contact member and the surface $F_A$ of the first support used in the electrode material jetting step will be described.

(Contact Surface $F_B$ of Contact Member)

In the present disclosure, the contact surface $F_B$ of the contact member may have surface properties in which the wall friction angle θ1 between the contact surface and the electrode material satisfies the above relationship (1). Specifically, the contact surface $F_B$ of the contact member preferably has excellent water repellency, and a contact angle thereof with water is preferably 75° or more, more preferably 80° or more, and even more preferably 85° or more.

Although not particularly limited, the upper limit of the contact angle of the contact surface $F_B$ of the contact member with water is 180° or less since the above angle is a contact angle. The upper limit is more preferably 150° or less.

In order for the contact surface $F_B$ of the contact member to achieve the above contact angle with water, the contact member preferably has a surface layer containing at least one of a fluorine atom or a silicon atom on the surface that is brought into contact with the electrode material.

The surface layer is preferably a layer containing at least one of a compound having a fluorine atom in the molecule or a compound having a silicon atom in the molecule.

The compound having a fluorine atom in the molecule is preferably a resin having a fluorine atom in the molecule, and specific examples thereof include a tetrafluoroethylene-perfluoroalkyl vinyl ether copolymer (PFA), polytetrafluoroethylene (PTFE), a tetrafluoroethylene-hexafluoropropylene copolymer (FEP), a polyethylene-tetrafluoroethylene copolymer (ETFE), polyvinylidene fluoride (PVDF), polychlorotrifluorinated ethylene (PCTFE), and polyvinyl fluoride (PVF).

The compound having a silicon atom in the molecule is preferably a resin having a silicon atom in the molecule, and specific examples of the resin having a silicon atom in the molecule include a methyl silicone resin, a phenyl silicone resin, a methyl phenyl silicone resin, an epoxy-modified silicone resin, a polyester-modified silicone resin, and a urethane-modified silicone resin.

In addition, the surface layer preferably further contains an antistatic agent.

As the antistatic agent, antistatic agents that have been known are used.

A commercially available coating agent may be used to form the surface layer. Specific examples of commercially available coating agents include A coat, NF-004, NF-015, NF-004EC, NF-004A, NF-015A, and NF-015EC manufactured by NIPPON FUSSO CO., LTD.

"EC" series manufactured by NIPPON FUSSO CO., LTD. are antistatic coating agents.

In addition, the contact member may have an undercoat layer as an underlayer of the surface layer on the surface that is brought into contact with the electrode material.

Examples of the undercoat layer include a layer obtained by roughening the surface of the contact member by sandblasting or the like, and then applying a material mainly containing an epoxy resin.

The contact surface $F_B$ of the contact member preferably has an arithmetic average roughness Ra of 10 μm or less from the viewpoint of a further increase of the releasability of the electrode material.

The arithmetic average roughness Ra of the contact surface $F_B$ of the contact member is preferably 8 μm or less, and more preferably 5 μm or less.

The lower limit of the arithmetic average roughness Ra of the contact surface $F_B$ of the contact member is, for example, 0.05 μm.

The arithmetic average roughness Ra of the contact surface $F_B$ of the contact member is measured by the following method.

The surface shape of the contact member is measured with a laser displacement gauge or the like, and a surface shape profile is calculated. The arithmetic average roughness is obtained by the following expression by extracting a standard length L from the calculated roughness curve in a direction of the average line of the roughness curve, taking an x-axis in the direction of the average line and a y-axis in a direction of longitudinal magnification of the extracted part, and expressing the roughness curve as y=f(x).

$$Ra = \frac{1}{L}\int_0^L |f(x)|dx$$

(Surface $F_A$ of First Support)

In the present disclosure, the surface $F_A$ of the first support may have surface properties in which the wall friction angle θ2 between the surface and the electrode material satisfies the above relationship (2). Specifically, the surface $F_A$ of the first support preferably has a contact angle of 30° or more and less than 75°, and more preferably 40° or more and 60° or less with water.

In order for the contact angle of the surface $F_A$ of the first support with water to be within the above range, it is preferable that the material itself of the first support is selected so that the contact angle with water is within the above range, or the surface of the first support that is brought into contact with the electrode material has a surface layer whose contact angle with water is controlled within the above range.

Examples of the material whose contact angle with water is 30° or more and less than 75° include metals such as stainless steel (also referred to as SUS) and glass.

Examples of the surface layer whose contact angle with water is controlled to be 30° or more and less than 75° include a layer containing polyvinyl alcohol, titanium dioxide, or the like having a degree of saponification of 90% or more.

Here, the contact angle of the contact surface $F_B$ of the contact member with water and the contact angle of the surface $F_A$ of the first support with water are measured by an aerial water droplet method.

Specifically, for example, DMo-701 (manufactured by Kyowa Interface Science Co., Ltd.) is used to obtain a contact angle of water with the contact surface $F_B$ of the contact member or the surface $F_A$ of the first support. The water droplet capacity used for the measurement is 1 μL, and the water droplet temperature is 25° C.

First Support

Preferable examples of the first support include a release material having a surface $F_A$ whose contact angle with water is within the above range.

Examples of the release material include release paper (for example, SP-8E ivory manufactured by NIHON-LA-BEL), surface-treated metals (for example, aluminum and stainless steel, films having a surface layer, and paper having a surface layer. Among these, release paper is preferable.

Here, the surface layer refers to the above-described surface layer whose contact angle with water is controlled to be 30° or more and less than 75°.

The shape of the first support is preferably a flat plate shape, a film shape, or a sheet shape from the viewpoint of transportability and the like.

The average thickness of the first support is preferably 5 μm or more, more preferably 10 μm or more, and particularly preferably 20 μm or more from the viewpoint of transportability and the like.

The average thickness of the first support is preferably 500 μm or less, more preferably 300 μm or less, and particularly preferably 200 μm or less from the viewpoint of flexibility and lightweight property.

The average thickness of the first support is an arithmetic average of the thicknesses measured at three points by cross-section observation. In the cross-section observation, known microscopes (for example, a scanning electron microscope) can be used.

The size of the first support is not limited, and may be determined according to the size of a formed body for an electrode to be manufactured, the sizes of various members used in the manufacturing process, and the like.

Second Support

As described above, since the second support corresponds to the "contact member" in the present disclosure, at least the surface corresponding to the contact surface $F_B$ preferably has a contact angle of 75° or more with water.

Examples of the material constituting the second support include resins, metals, and paper, and a material in which on one of the above materials, a surface layer whose contact angle with water is 75° or more as described above is formed is preferably used.

The second support is preferably a collector, and more preferably a collector having a surface layer, whose contact angle with water is 75° or more, formed on a surface of the collector.

In a case where the second support is a collector, the electrode material can be easily placed on the collector. Moreover, it is possible to improve the productivity in obtaining a formed body for an electrode with a collector.

The collector is not limited, and known collectors can be used.

Examples of the positive electrode collector include aluminum, aluminum alloys, stainless steel, nickel, and titanium. The positive electrode collector is preferably aluminum or an aluminum alloy. The positive electrode collector is also preferably aluminum or stainless steel having a surface with a coating layer containing carbon, nickel, titanium, or silver.

Examples of the negative electrode collector include aluminum, copper, copper alloys, stainless steel, nickel, and titanium. The negative electrode collector is preferably aluminum, copper, a copper alloy, or stainless steel, and more preferably copper or a copper alloy. The negative electrode collector is also preferably aluminum, copper, a copper alloy, or stainless steel having a surface with a coating layer containing carbon, nickel, titanium, or silver.

As the collector, aluminum foil or copper foil is preferable. Aluminum foil is usually used as a collector at the positive electrode. Copper foil is usually used as a collector at the negative electrode.

The second support may be meshed or punched. In addition, the second support may be a porous body, a foam, or a formed body of a fiber group.

The surface of the second support may have unevenness caused by a surface treatment.

The shape of the second support is preferably a film shape or a sheet shape.

The average thickness of the second support is preferably 1 μm to 500 μm, more preferably 3 μm to 300 μm, and particularly preferably 5 μm to 200 μm from the viewpoint of transportability and penetration resistance.

The average thickness of the second support is also measured in the same manner as the average thickness of the first support.

[Jetting Unit]

In the electrode material jetting step, the electrode material is jetted from the outlet. In the first embodiment and the second embodiment described above, the hopper (an example of the storage member) 30 is used and described as a jetting unit jetting the electrode material, but the jetting unit is not limited thereto.

The jetting unit jetting the electrode material may have an outlet, and examples thereof include a screw feeder, a disk feeder, a rotary feeder, and a belt feeder in addition to the hopper.

Regarding the jetting unit, at least a wall friction angle θ1 between an inner peripheral surface of the outlet and the electrode material preferably satisfies the above relationship (1).

In the jetting unit, the outlet preferably has an on-off mechanism controlling the supply of the electrode material from the viewpoint of preventing contamination due to the scattering of the electrode material. Here, the "on-off mechanism" means a movable mechanism capable of opening and closing a flow passage of the electrode material. Examples of the valve body used for the on-off mechanism include a plate-shaped valve body and a spherical valve body.

In the electrode material jetting step, the amount of the electrode material to be jetted by the jetting unit is preferably 0.01 kg/min to 100 kg/min, more preferably 0.1 kg/min to 10 kg/min, and particularly preferably 0.5 kg/min to 5 kg/min from the viewpoint of stability.

[Regulating Unit]

In the electrode material jetting step, a regulating unit regulating the amount of the electrode material may be used. In the method of manufacturing a formed body for an electrode according to the present disclosure, the regulating unit may be omitted, or coupled to the outlet of the jetting unit and integrated with the jetting unit.

In the first embodiment and the second embodiment described above, the regulating roll 40 is used and described as a regulating unit regulating the amount, density distribution, and the like of the electrode material, but the regulating unit is not limited thereto.

The regulating unit may have a contact surface that is brought into direct or indirect contact with the electrode material, and examples thereof include a scraper and a plate-shaped member (for example, a squeegee) in addition to a roll member such as a regulating roll.

In a case where the regulating unit corresponds to the "contact member" in the present disclosure, the wall friction angle θ1 between the contact surface of the regulating unit that is brought into contact with the electrode material and the electrode material preferably satisfies the above relationship (1).

On the contact surface of the regulating unit that is brought into contact with the electrode material, an uneven shape may be formed. In a case where the surface of the regulating unit has an uneven shape, the amount, density distribution, and the like of the electrode material are easily controlled.

In the present disclosure, in the regulation of the amount, density distribution, and the like of the electrode material, in addition to the above-described regulating unit, a vibrating unit vibrating the electrode material may be used in combination.

By providing the vibrating unit, the amount, density distribution, and the like of the electrode material are easily controlled.

Examples of the vibrating unit include a general vibrator.

[Electrode Material Preparation Step]

The method of manufacturing a formed body for an electrode according to the present disclosure preferably has a step of preparing an electrode material (that is, electrode material preparation step) before the electrode material jetting step.

In the present disclosure, "preparing an electrode material" means that the electrode material is made to be in a usable state, and includes preparing the electrode material unless otherwise specified. That is, in the electrode material preparation step, a pre-prepared electrode material or a commercially available electrode material may be prepared, or an electrode material may be prepared.

[Electrode Material]

The electrode material contains an electrode active material. The electrode material may optionally contain a component other than the electrode active material.

Hereinafter, components contained in the electrode material will be described.

(Electrode Active Material)

The electrode active material is a substance capable of inserting and releasing ions of metal elements belonging to Group 1 or 2 in the periodic table.

Examples of the electrode active material include positive electrode active materials and negative electrode active materials.

—Positive Electrode Active Material—

The positive electrode active material is not limited, and known active materials used for a positive electrode can be used. The positive electrode active material is preferably a positive electrode active material capable of reversibly inserting and releasing lithium ions.

Specific examples of the positive electrode active material include transition metal oxides and elements (for example, sulfur) that can be combined with lithium. Among the above examples, the positive electrode active material is preferably a transition metal oxide.

The transition metal oxide is preferably a transition metal oxide containing at least one transition metal element (hereinafter, referred to as "element Ma") selected from the group consisting of cobalt (Co), nickel (Ni), iron (Fe), manganese (Mn), copper (Cu), and vanadium (V).

In a case where the transition metal oxide contains Li and an element Ma, a molar ratio of Li to the element Ma (substance amount of Li/substance amount of element Ma) is preferably 0.3 to 2.2. In the present disclosure, the "substance amount of element Ma" refers to a total substance amount of all elements corresponding to the element Ma.

In addition, the transition metal oxide may contain at least one transition metal element (hereinafter, referred to as "element Mb") selected from the group consisting of Group 1 elements other than lithium, Group 2 elements, aluminum (Al), gallium (Ga), indium (In), germanium (Ge), tin (Sn), lead (Pb), antimony (Sb), bismuth (Bi), silicon (Si), phosphorus (P), and boron (B). The content of the element Mb (that is, a total content of all elements corresponding to the element Mb) is preferably 0 mol % to 30 mol % with respect to the substance amount of the element Ma.

Examples of the transition metal oxide include transition metal oxides having a bedded salt-type structure, transition metal oxides having a spinel-type structure, lithium-containing transition metal phosphate compounds, lithium-containing transition metal halogenated phosphate compounds, and lithium-containing transition metal silicate compounds.

Examples of the transition metal oxides having a bedded salt-type structure include $LiCoO_2$ (lithium cobalt oxide [LCO]), $LiNi_2O_2$ (lithium nickel oxide), $LiNi_{0.85}Co_{0.10}Al_{0.05}O_2$ (lithium nickel cobalt aluminum oxide [NCA]), $LiNi_{1/3}Co_{1/3}Mn_{1/3}O_2$ (lithium nickel manganese cobalt oxide [NMC]), and $LiNi_{0.5}Mn_{0.5}O_2$ (lithium manganese nickel oxide).

Examples of the transition metal oxides having a spinel-type structure include $LiCoMnO_4$, $Li_2FeMn_3O_8$, $Li_2CuMn_3O_8$, $Li_2CrMn_3O_8$, and $Li_2NiMn_3O_8$.

Examples of the lithium-containing transition metal phosphate compounds include olivine-type iron phosphate salts (for example, $LiFePO_4$ and $Li_3Fe_2(PO_4)_3$), iron pyrophosphate salts (for example, $LiFeP_2O_7$), cobalt phosphate salts (for example, $LiCoPO_4$), and monoclinic nasicon-type vanadium phosphate salts (for example, $Li_3V_2(PO_4)_3$ (lithium vanadium phosphate)).

Examples of the lithium-containing transition metal halogenated phosphate compounds include fluorinated iron phosphate salts (for example, $Li_2FePO_4F$), fluorinated manganese phosphate salts (for example, $Li_2MnPO_4F$), and fluorinated cobalt phosphate salts (for example, $Li_2CoPO_4F$).

Examples of the lithium-containing transition metal silicate compounds include $Li_2FeSiO_4$, $Li_2MnSiO_4$, and $Li_2CoSiO_4$.

The transition metal oxide is preferably a transition metal oxide having a bedded salt-type structure, and more preferably at least one compound selected from the group consisting of $LiCoO_2$ (lithium cobalt oxide [LCO]), $LiNi_{0.85}Co_{0.10}Al_{0.05}O_2$ (lithium nickel cobalt aluminum oxide [NCA]), and $LiNi_{1/3}Co_{1/3}Mn_{1/3}O_2$ (lithium nickel manganese cobalt oxide [NMC]).

The positive electrode active material may be a commercially available product or a synthetic product manufactured by a known method (for example, a firing method). For example, a positive electrode active material obtained by the firing method may be washed with water, an acidic aqueous solution, an alkaline aqueous solution, or an organic solvent.

The composition of the positive electrode active material is measured using inductive coupling plasma (ICP) emission spectrometric analysis.

The shape of the positive electrode active material is not limited, and is preferably a particulate shape from the viewpoint of handleability.

The volume average particle diameter of the positive electrode active material is not limited, and may be, for example, 0.1 μm to 50 μm. The volume average particle diameter of the positive electrode active material is preferably 0.3 μm to 40 μm, and more preferably 0.5 μm to 30 μm.

In a case where the volume average particle diameter of the positive electrode active material is 0.3 μm or more, it is possible to easily form an aggregate of the electrode material, and it is possible to suppress the scattering of the electrode material during handling. In a case where the volume average particle diameter of the positive electrode active material is 40 μm or less, it is possible to easily adjust the thickness of a formed body for an electrode, and it is possible to suppress the generation of voids during the course of forming.

The volume average particle diameter of the positive electrode active material is measured by the following method.

A dispersion liquid containing 0.1 mass % of the positive electrode active material is prepared by mixing the positive electrode active material with a solvent (for example, heptane, octane, toluene, or xylene). The dispersion liquid irradiated with 1 kHz of ultrasonic waves for 10 minutes is used as a measurement sample. Using a laser diffraction/scattering-type particle size distribution analyzer (for example, LA-920 manufactured by HORIBA, Ltd.), data is imported 50 times under the condition of a temperature of 25° C. to obtain a volume average particle diameter. A quartz cell is used as a measurement cell. The above measurement is performed using five samples, and an average of the measured values is defined as the volume average particle diameter of the positive electrode active material. For other detailed conditions, refer to "JIS Z 8828: 2013" as necessary.

Examples of the method of adjusting the particle diameter of the positive electrode active material include a method using a pulverizer or a classifier.

The electrode material may contain one kind of positive electrode active material alone, or two or more kinds of positive electrode active materials.

The content of the positive electrode active material is preferably 10 mass % to 95 mass %, more preferably 30 mass % to 90 mass %, even more preferably 50 mass % to 85 mass %, and particularly preferably 60 mass % to 80 mass % with respect to the total solid content mass of the electrode material.

—Negative Electrode Active Material—

The negative electrode active material is not limited, and known active materials used for a negative electrode can be used. The negative electrode active material is preferably a negative electrode active material capable of reversibly inserting and releasing lithium ions.

Examples of the negative electrode active material include carbonaceous materials, metal oxides (for example, tin oxide), silicon oxides, metal composite oxides, lithium single bodies, lithium alloys (for example, lithium aluminum alloy), and metals (for example, Sn, Si, and In) that can form an alloy with lithium. Among the above examples, the negative electrode active material is preferably a carbonaceous material or a lithium composite oxide from the viewpoint of reliability.

The carbonaceous material is substantially a material consisting of carbon.

Examples of the carbonaceous material include carbonaceous materials obtained by firing petroleum pitch, carbon black (for example, acetylene black), graphite (for example, natural graphite and artificial graphite (for example, vapor-grown graphite)), hard carbon, or synthetic resins (for example, polyacrylonitrile (PAN) and furfuryl alcohol resin). Examples of the carbonaceous material also include carbon fibers (for example, polyacrylonitrile-based carbon fibers, cellulose-based carbon fibers, pitch-based carbon fibers, vapor-grown carbon fibers, dehydrated polyvinyl alcohol (PVA)-based carbon fibers, lignin carbon fibers, glassy carbon fibers, and activated carbon fibers). Examples of the graphite include mesophase microspheres, graphite whisker, and flat graphite.

In the present disclosure, "flat" means a shape having two principal planes facing in opposite directions.

The metal composite oxide is preferably a metal composite oxide capable of storing and releasing lithium.

The metal composite oxide capable of storing and releasing lithium preferably contains at least one element selected from the group consisting of titanium and lithium from the viewpoint of high current density charging and discharging characteristics.

The metal oxide and the metal composite oxide are particularly preferably amorphous oxides. Here, "amorphous" means a substance having a broad scattering band having a peak at 20° to 40° in terms of 2θ in an X-ray diffraction method using CuKα rays. The amorphous oxide may have a crystalline diffraction line. In the amorphous oxide, the highest intensity of the crystalline diffraction lines observed at 40° to 70° in terms of 2θ is preferably 100 times or less, and more preferably 5 times or less the intensity of a diffraction line having a peak in a broad scattering band observed at 20° to 40° in terms of 2θ. The amorphous oxide particularly preferably has no crystalline diffraction line.

The metal oxide and the metal composite oxide are also preferably chalcogenides. A chalcogenide is a reaction product of a metal element and an element of Group 16 in the periodic table.

Among the compound group consisting of amorphous oxides and chalcogenides, amorphous oxides and chalcogenides of metalloid elements are preferable, and oxides and chalcogenides containing at least one element selected from the group consisting of elements of Groups 13 to 15 in the periodic table, Al, Ga, Si, Sn, Ge, Pb, Sb, and Bi are more preferable.

Preferable examples of the amorphous oxides and chalcogenides include $Ga_2O_3$, SiO, GeO, SnO, $SnO_2$, PbO, $PbO_2$, $Pb_2O_3$, $Pb_2O_4$, $Pb_3O_4$, $Sb_2O_3$, $Sb_2O_4$, $Sb_2O_8Bi_2O_3$, $Sb_2O_8Si_2O_3$, $Bi_2O_4$, $SnSiO_3$, GeS, SnS, $SnS_2$, PbS, $PbS_2$, $Sb_2S_3$, $Sb_2S_5$, and $SnSiS_3$. In addition, the above-described compound may be a composite oxide with lithium (for example, $Li_2SnO_2$).

The negative electrode active material preferably further contains titanium. The negative electrode active material containing titanium is preferably $Li_4Ti_5O_{12}$ (lithium titanate [referred to as LTO]) from the viewpoint that it has excellent high-speed charging and discharging characteristics since the volume thereof changes only to a small extent during the storing and release of lithium ions, and the life of the lithium ion secondary battery can be improved due to the suppression of deterioration of the electrode.

The negative electrode active material may be a commercially available product or a synthetic product manufactured by a known method (for example, a firing method). For example, a negative electrode active material obtained by the firing method may be washed using water, an acidic aqueous solution, an alkaline aqueous solution, or an organic solvent.

For example, CGB20 (Nippon Graphite Industries, Co., Ltd.) is available as the negative electrode active material.

The composition of the negative electrode active material is measured using inductive coupling plasma (ICP) emission spectrometric analysis.

The shape of the negative electrode active material is not limited, and is preferably a particulate shape from the viewpoint of easy handling and easy control of uniformity during mass production.

The volume average particle diameter of the negative electrode active material is preferably 0.1 μm to 60 μm, more preferably 0.3 μm to 50 μm, and particularly preferably 0.5 μm to 40 μm.

In a case where the volume average particle diameter of the negative electrode active material is 0.1 μm or more, it is possible to easily form an aggregate of the electrode material, and it is possible to suppress the scattering of the electrode material during handling. In a case where the volume average particle diameter of the negative electrode active material is 60 μm or less, it is possible to easily adjust the thickness of a formed body for an electrode, and it is possible to suppress the generation of voids during the course of forming.

The volume average particle diameter of the negative electrode active material is measured by a method equivalent to the method of measuring the volume average particle diameter of the positive electrode active material.

Examples of the method of adjusting the particle diameter of the negative electrode active material include a method using a pulverizer or a classifier. In the above-described method, for example, a mortar, a ball mill, a sand mill, a vibrating ball mill, a satellite ball mill, a planetary ball mill, a swirling airflow-type jet mill, or a sieve is suitably used. In the pulverization of the negative electrode active material, wet pulverization using water or an organic solvent (for example, methanol) can also be optionally performed. The method of adjusting to a desired particle diameter is preferably classification. In the classification, for example, a sieve or a wind power classifier can be used. The classification may be performed in a dry manner or in a wet manner.

In a case where an amorphous oxide containing Sn, Si, or Ge is used as the negative electrode active material, preferable examples of the negative electrode active material that can be used in combination with the above-described amorphous oxide include carbon materials capable of storing and releasing lithium ions or a lithium metal, lithium, lithium alloys, and metals capable of being alloyed with lithium.

The electrode material may contain one kind of negative electrode active material alone, or two or more kinds of negative electrode active materials.

The content of the negative electrode active material is preferably 10 mass % to 80 mass %, more preferably 20 mass % to 80 mass %, even more preferably 30 mass % to 80 mass %, and particularly preferably 40 mass % to 75 mass % with respect to the total solid content mass of the electrode material.

The surface of each of the positive electrode active material and the negative electrode active material may be coated with a surface coating agent. Examples of the surface coating agent include metal oxides containing Ti, Nb, Ta, W, Zr, Si, or Li. Examples of the metal oxides include titanate spinels, tantalum-based oxides, niobium-based oxides, and lithium niobate-based compounds. Specific examples of the compounds include $Li_4Ti_5O_{12}$, $LiTaO_3$, $LiNbO_3$, $LiAlO_2$, $Li_2ZrO_3$, $Li_2WO_4$, $Li_2TiO_3$, $Li_2B_4O_7$, $Li_3PO_4$, $Li_2MoO_4$, and $LiBO_2$.

(Inorganic Solid Electrolyte)

The electrode material preferably contains an inorganic solid electrolyte from the viewpoint of an improvement in battery performance (for example, discharge capacity and output characteristics).

Here, the "solid electrolyte" means a solid-state electrolyte in which ions can move inside thereof.

Since the inorganic solid electrolyte is not an electrolyte containing an organic substance as a principal ion-conductive material, it is clearly differentiated from organic solid electrolytes (for example, polymer electrolytes represented by polyethylene oxide (PEO), and organic electrolyte salts represented by lithium bis(trifluoromethanesulfonyl)imide (LiTFSI)). In addition, since the inorganic solid electrolyte is solid at steady state, it is not dissociated or liberated into cations or anions. Therefore, the inorganic solid electrolyte is also clearly differentiated from inorganic electrolyte salts (for example, $LiPF_6$, $LiBF_4$, lithium bis(fluoroulfonyl)imide (LiFSI), and LiCl) that are dissociated or liberated into cations or anions in electrolytic solutions or polymers.

The inorganic solid electrolyte is not limited as long as it is an inorganic solid electrolyte having ion conductivity of a metal element belonging to Group 1 or 2 in the periodic table, and generally does not have electron conductivity.

In a case where a formed body for an electrode obtained by the method of manufacturing a formed body for an electrode according to the present disclosure is used for a lithium ion battery, the inorganic solid electrolyte preferably has lithium ion conductivity.

Examples of the inorganic solid electrolyte include sulfide-based inorganic solid electrolytes and oxide-based inorganic solid electrolytes. Among the above examples, the inorganic solid electrolyte is preferably a sulfide-based inorganic solid electrolyte from the viewpoint that a good interface can be formed between the active material and the inorganic solid electrolyte.

—Sulfide-Based Inorganic Solid Electrolyte—

The sulfide-based inorganic solid electrolyte preferably contains a sulfur atom (S), has ion conductivity of a metal element belonging to Group 1 or 2 in the periodic table, and has an electron-insulating property.

The sulfide-based inorganic solid electrolyte more preferably contains at least Li, S, and P, and has lithium ion conductivity. The sulfide-based inorganic solid electrolyte may optionally contain an element other than Li, S, and P.

Examples of the sulfide-based inorganic solid electrolyte include an inorganic solid electrolyte having a composition represented by Formula (A).

$$L_{a1}M_{b1}P_{c1}S_{d1}A_{e1}:$$  Formula (A)

In Formula (A), L represents at least one element selected from the group consisting of Li, Na, and K, and is preferably Li.

In Formula (A), M represents at least one element selected from the group consisting of B, Zn, Sn, Si, Cu, Ga, Sb, Al, and Ge, and is preferably B, Sn, Si, Al, or Ge, and more preferably Sn, Al, or Ge.

In Formula (A), A represents at least one element selected from the group consisting of I, Br, Cl, and F, and is preferably I or Br, and more preferably I.

In Formula (A), a1 represents 1 to 12, and is preferably 1 to 9, and more preferably 1.5 to 4.

In Formula (A), b1 represents 0 to 1, and is more preferably 0 to 0.5.

In Formula (A), c1 represents 1.

In Formula (A), d1 represents 2 to 12, and is preferably 3 to 7, and more preferably 3.25 to 4.5.

In Formula (A), e1 represents 0 to 5, and is preferably 0 to 3, and more preferably 0 to 1.

In Formula (A), it is preferable that b1 and e1 are 0, it is more preferable that b1 and e1 are 0, and a proportion of a1, c1, and d1 (that is, a1:c1:d1) is 1 to 9:1:3 to 7, and it is particularly preferable that b1 and e1 are 0, and a proportion of a1, c1, and d1 (that is, a1:c1:d1) is 1.5 to 4:1:3.25 to 4.5.

The compositional ratio of each element can be controlled by, for example, adjusting an amount of the raw material compound to be blended in the manufacturing of the sulfide-based inorganic solid electrolyte.

The sulfide-based inorganic solid electrolyte may be amorphous (glass) or crystallized (glass ceramics), or only partially crystallized. Examples of the sulfide-based inorganic solid electrolyte described above include Li—P—S-based glass containing Li, P, and S, and Li—P—S-based glass ceramics containing Li, P, and S. Among the above examples, the sulfide-based inorganic solid electrolyte is preferably Li—P—S-based glass.

The lithium ion conductivity of the sulfide-based inorganic solid electrolyte is preferably $1\times10^{-4}$ S/cm or more, and more preferably $1\times10^{-3}$ S/cm or more. The upper limit of the lithium ion conductivity of the sulfide-based inorganic solid electrolyte is not limited, and for example, substantially $1\times10^{-1}$ S/cm or less.

The sulfide-based inorganic solid electrolyte can be manufactured by, for example, (1) a reaction of lithium sulfide ($Li_2S$) and phosphorus sulfide (for example, diphosphorus pentasulfide ($P_2S_5$)), (2) a reaction of lithium sulfide and at least one of a phosphorus single body or a sulfur single body, or (3) a reaction of lithium sulfide, phosphorus sulfide (for example, diphosphorus pentasulfide ($P_2S_5$)), and at least one of a phosphorus single body or a sulfur single body.

The molar ratio of $Li_2S$ to $P_2S_5$ ($Li_2S:P_2S_5$) in the manufacturing of the Li—P—S-based glass and the Li—P—S-based glass ceramics is preferably 65:35 to 85:15, and more preferably 68:32 to 77:23. By setting the molar ratio of $Li_2S$ to $P_2S_5$ within the above range, lithium ion conductivity can be further increased.

Examples of the sulfide-based inorganic solid electrolyte include a compound formed of a raw material composition containing $Li_2S$ and a sulfide of an element of Groups 13 to 15.

Examples of the raw material composition include $Li_2S$—$P_2S_5$, $Li_2S$—LiI—$P_2S_5$, $Li_2S$—LiI—$Li_2O$—$P_2S_5$, $Li_2S$—LiBr—$P_2S_5$, $Li_2S$—$Li_2O$—$P_2S_5$, $Li_2S$—$Li_3PO_4$—$P_2S_5$, $Li_2S$—$P_2S_5$—$P_2O_5$, $Li_2S$—$P_2S_5$—$SiS_2$, $Li_2S$—$P_2S_5$—SnS, $Li_2S$—$P_2S_5$—$Al_2S_3$, $Li_2S$—$GeS_2$, $Li_2S$—$GeS_2$—ZnS, $Li_2S$—$Ga_2S_3$, $Li_2S$—$GeS_2$—$Ga_2S_3$, $Li_2S$—$GeS_2$—$P_2S_5$, $Li_2S$—$GeS_2$—$Sb_2S_5$, $Li_2S$—$GeS_2$—$Al_2S_3$, $Li_2S$—$SiS_2$, $Li_2S$—$Al_2S_3$, $Li_2S$—$SiS_2$—$Al_2S_3$, $Li_2S$—$SiS_2$—$P_2S_5$, $Li_2S$—$SiS_2$—$P_2S_5$—LiI, $Li_2S$—$SiS_2$—LiI, $Li_2S$—$SiS_2$—$Li_4SiO_4$, $Li_2S$—$SiS_2$—$Li_3PO_4$, and $Li_{10}GeP_2S_{12}$. Among the above examples, the raw material composition is preferably $Li_2S$—$P_2S_5$, $Li_2S$—$GeS_2$—$Ga_2S_3$, $Li_2S$—$SiS_2$—$P_2S_5$, $Li_2S$—$SiS_2$—$Li_4SiO_4$, $Li_2S$—$SiS_2$—$Li_3PO_4$, $Li_2S$—LiI—$Li_2O$—$P_2S_5$, $Li_2S$—$Li_2O$—$P_2S_5$, $Li_2S$—$Li_3PO_4$—$P_2S_5$, $Li_2S$—$GeS_2$—$P_2S_5$, or $Li_{10}GeP_2Si_2$, and more preferably $Li_2S$—$P_2S_5$, $Li_{10}GeP_2Si_2$, or $Li_2S$—$P_2S_5$—$SiS_2$ from the viewpoint of high lithium ion conductivity.

Examples of the method of manufacturing the sulfide-based inorganic solid electrolyte using the above-described raw material composition include an amorphization method.

Examples of the amorphization method include a mechanical milling method and a melting quenching method. Among the above examples, a mechanical milling method is preferable from the viewpoint that the treatment can be performed at normal temperature and the manufacturing process can be simplified.

—Oxide-Based Inorganic Solid Electrolyte—

The oxide-based inorganic solid electrolyte preferably contains an oxygen atom (O), has ion conductivity of a metal element belonging to Group 1 or Group 2 in the periodic table, and has an electron-insulating property.

The ion conductivity of the oxide-based inorganic solid electrolyte is preferably $1\times10^{-6}$ S/cm or more, more preferably $5\times10^{-6}$ S/cm or more, and particularly preferably $1\times10^{-5}$ S/cm or more. The upper limit of the ion conductivity of the oxide-based inorganic solid electrolyte is not limited, and for example, substantially $1\times10^{-1}$ S/cm or less.

Examples of the oxide-based inorganic solid electrolyte include the following compounds. However, the oxide-based inorganic solid electrolyte is not limited to the following compounds.

(1) $Li_{xa}La_{ya}TiO_3$ (hereinafter, referred to as "LLT". xa satisfies $0.3 \leq xa \leq 0.7$ and ya satisfies $0.3 \leq ya \leq 0.7$)

(2) $Li_{xb}La_{yb}Zr_{zb}M^{bb}{}_{mb}O_{nb}$ ($M^{bb}$ is at least one element selected from the group consisting of Al, Mg, Ca, Sr, V, Nb, Ta, Ti, Ge, In, and Sn. xb satisfies $5 \leq xb \leq 10$, yb satisfies $1 \leq yb \leq 4$, zb satisfies $1 \leq zb \leq 4$, mb satisfies $0 \leq mb \leq 2$, and nb satisfies $5 \leq nb \leq 20$)

(3) $Li_{xc}B_{yc}M^{cc}{}_{zc}O_{nc}$ ($M^{cc}$ is at least one element selected from the group consisting of C, S, Al, Si, Ga, Ge, In, and Sn. xc satisfies $0 \leq xc \leq 5$, yc satisfies $0 \leq yc \leq 1$, zc satisfies $0 \leq zc \leq 1$, and nc satisfies $0 \leq nc \leq 6$)

(4) $Li_{xd}(Al, Ga)_{yd}(Ti, Ge)_{zd}Si_{ad}P_{md}O_{nd}$ (xd satisfies $1 \leq xd \leq 3$, yd satisfies $0 \leq yd \leq 1$, zd satisfies $0 \leq zd \leq 2$, ad satisfies $0 \leq ad \leq 1$, md satisfies $1 \leq md \leq 7$, and nd satisfies $3 \leq nd \leq 13$)

(5) $Li_{(3-2xe)}M^{ee}{}_{xe}D^{ee}O$ (xe satisfies $0 \leq xe \leq 0.1$, $M^{ee}$ represents a divalent metal atom, and $D^{ee}$ represents a halogen atom or a combination of two or more halogen atoms)

(6) $Li_{xf}Si_{yf}O_{zf}$ (xf satisfies $1 \leq xf \leq 5$, yf satisfies $0 < yf \leq 3$, and zf satisfies $1 \leq zf \leq 10$)

(7) $Li_{xg}S_{yg}O_{zg}$ (xg satisfies $1 \leq xg \leq 3$, yg satisfies $0 < yg \leq 2$, and zg satisfies $1 \leq zg \leq 10$)

(8) $Li_3BO_3$ (9) $Li_3BO_3$—$Li_2SO_4$

(10) $Li_2O$—$B_2O_3$—$P_2O_5$

(11) $Li_2O$—$SiO_2$

(12) $Li_6BaLa_2Ta_2O_{12}$

(13) $Li_3PO_{(4-3/2w)}N_w$ (w satisfies $w<1$)

(14) $Li_{3.5}Zn_{0.25}GeO_4$ having a lithium super ionic conductor (LISICON)-type crystal structure

(15) $La_{0.55}Li_{0.35}TiO_3$ having a perovskite-type crystal structure

(16) $LiTi_2P_3O_{12}$ having a natrium super ionic conductor (NASICON)-type crystal structure

(17) $Li_{1+xh+yh}(Al, Ga)_{xh}(Ti, Ge)_{2-xh}Si_{yh}P_{3-yh}O_{12}$ (xh satisfies $0 \leq xh \leq 1$ and yh satisfies $0 \leq yh \leq 1$)

(18) $Li_7La_3Zr_2O_{12}$ having a garnet-type crystal structure (hereinafter, referred to as "LLZ")

As the oxide-based inorganic solid electrolyte, phosphorus compounds containing Li, P, and O are also preferable. Examples of the phosphorus compounds containing Li, P, and O include lithium phosphate ($Li_3PO_4$), LiPON in which a part of oxygen of lithium phosphate is substituted with nitrogen, and LiPOD1 (D1 is at least one element selected from the group consisting of Ti, V, Cr, Mn, Fe, Co, Ni, Cu, Zr, Nb, Mo, Ru, Ag, Ta, W, Pt, and Au).

As the oxide-based inorganic solid electrolyte, LiAlON (Al is at least one element selected from the group consisting of Si, B, Ge, Al, C, and Ga) is also preferable.

Among the above examples, the oxide-based inorganic solid electrolyte is preferably LLT, $Li_{xb}La_{yb}Zr_{zb}M^{bb}{}_{mb}O_{nb}$ ($M^{bb}$, xb, yb, zb, mb, and nb are as described above), LLZ, $Li_3BO_3$, $Li_3BO_3$—$Li_2SO_4$, or $Li_{xd}(Al, Ga)_{yd}(Ti, Ge)_{zd}Si_{ad}P_{md}O_{nd}$ (xd, yd, zd, ad, md, and nd are as described above), more preferably LLT, LLZ, LAGP ($Li_{1.5}Al_{0.5}Ge_{1.5}(PO_4)_3$), or LATP ($[Li_{1.4}Ti_2Si_{0.4}P_{2.6}O_{12}]$—$AlPO_4$), and particularly preferably LLZ.

The inorganic solid electrolyte preferably has a particulate shape.

The volume average particle diameter of the inorganic solid electrolyte is preferably 0.01 μm or more, and more preferably 0.1 μm or more. The upper limit of the volume average particle diameter of the inorganic solid electrolyte is preferably 100 μm or less, and more preferably 50 μm or less.

The volume average particle diameter of the inorganic solid electrolyte is measured by the following method.

A dispersion liquid containing 1 mass % of the inorganic solid electrolyte is prepared by mixing the inorganic solid electrolyte with water (heptane in a case where the volume average particle diameter of a substance unstable to water is measured). The dispersion liquid irradiated with 1 kHz of ultrasonic waves for 10 minutes is used as a measurement sample. Using a laser diffraction/scattering-type particle size distribution analyzer (for example, LA-920 manufactured by HORIBA, Ltd.), data is imported 50 times under the condition of a temperature of 25° C. to obtain a volume average particle diameter. A quartz cell is used as a measurement cell. The above measurement is performed using five samples, and an average of the measured values is defined as the volume average particle diameter of the inorganic solid electrolyte. For other detailed conditions, refer to "JIS Z 8828: 2013" as necessary.

The electrode material may contain one kind of inorganic solid electrolyte alone, or two or more kinds of inorganic solid electrolytes.

In a case where the electrode material contains an inorganic solid electrolyte, the content of the inorganic solid electrolyte is preferably 1 mass % or more, more preferably 5 mass % or more, and particularly preferably 10 mass % or more with respect to the total solid content mass of the electrode material from the viewpoint of reduction of interface resistance and a battery characteristic maintaining effect (for example, improvement in cycle characteristics). From the same viewpoint, the upper limit of the content of the inorganic solid electrolyte is preferably 90 mass % or less, more preferably 70 mass % or less, and particularly preferably 50 mass % or less with respect to the total solid content mass of the electrode material.

(Binder)

The electrode material preferably contains a binder from the viewpoint of an improvement in adhesiveness between the electrode materials. The binder is not limited as long as it is an organic polymer, and known binders used as a binder in a positive electrode or a negative electrode of the battery material can be used. Examples of the binder include fluorine-containing resins, hydrocarbon-based thermoplastic resins, acrylic resins, and urethane resins.

Examples of the fluorine-containing resins include polytetrafluoroethylene (PTFE), polyvinylene difluoride (PVdF), and a copolymer of polyvinylene difluoride and hexafluoropropylene (PVdF-HFP).

Examples of the hydrocarbon-based thermoplastic resins include polyethylene, polypropylene, styrene-butadiene rubber (SBR), hydrogenated styrene-butadiene rubber (HSBR), butylene rubber, acrylonitrile-butadiene rubber, polybutadiene, and polyisoprene.

Examples of the acrylic resins include methyl poly(meth)acrylate, ethyl poly(meth)acrylate, isopropyl poly(meth)acrylate, isobutyl poly(meth)acrylate, butyl poly(meth)acrylate, hexyl poly(meth)acrylate, octyl poly(meth)acrylate, dodecyl poly(meth)acrylate, stearyl poly(meth)acrylate, 2-hydroxyethyl poly(meth)acrylate, poly(meth)acrylate, benzyl poly(meth)acrylate, glycidyl poly(meth)acrylate, dimethylaminopropyl poly(meth)acrylate, and copolymers of monomers forming the above resins.

Examples of the binder also include copolymers of vinyl-based monomers.

Examples of the copolymers of vinyl-based monomers include a methyl (meth)acrylate-styrene copolymer, a methyl (meth)acrylate-acrylonitrile copolymer, and a butyl (meth)acrylate-acrylonitrile-styrene copolymer.

The weight-average molecular weight of the binder is preferably 10,000 or more, more preferably 20,000 or more, and particularly preferably 50,000 or more.

The upper limit of the weight-average molecular weight of the binder is preferably 1,000,000 or less, more preferably 200,000 or less, and particularly preferably 100,000 or less.

The moisture concentration in the binder is preferably 100 ppm or less on a mass basis.

The metal concentration in the binder is preferably 100 ppm or less on a mass basis.

The electrode material may contain one kind of binder alone, or two or more kinds of binders.

In a case where the electrode material contains a binder, the content of the binder is preferably 0.01 mass % or more, more preferably 0.1 mass % or more, and particularly preferably 1 mass % or more with respect to the total solid content mass of the electrode material from the viewpoint of reduction of interface resistance and maintaining of the reduction. The upper limit of the content of the binder is preferably 10 mass % or less, more preferably 5 mass % or less, and particularly preferably 3 mass % or less with respect to the total solid content mass of the electrode material from the viewpoint of battery performance.

In a case where the electrode material contains an electrode active material, an inorganic solid electrolyte, and a binder, a ratio of the total mass of the active material and the inorganic solid electrolyte to the mass of the binder ([mass of active material+mass of inorganic solid electrolyte]/[mass of the binder]) is preferably 1,000 to 1, more preferably 500 to 2, and particularly preferably 100 to 10.

(Conductive Auxiliary Agent)

The electrode material preferably contains a conductive auxiliary agent from the viewpoint of an improvement in electron conductivity of the active material. The conductive auxiliary agent is not limited, and known conductive auxiliary agents can be used. In particular, in a case where the electrode material contains a positive electrode active material, the electrode material preferably contains a conductive auxiliary agent.

Examples of the conductive auxiliary agent include graphite (for example, natural graphite and artificial graphite), carbon black (for example, acetylene black, Ketjen black, and furnace black), amorphous carbon (for example, needle coke), carbon fibers (for example, vapor-grown carbon fibers and carbon nanotubes), other carbonaceous materials (for example, graphene and fullerene), metal powders (for example, a copper powder and a nickel powder), metal fibers (for example, copper fibers and nickel fibers), and conductive polymers (for example, polyaniline, polypyrrole, polythiophene, polyacetylene, and polyphenylene derivatives).

Among the above examples, the conductive auxiliary agent is preferably at least one conductive auxiliary agent selected from the group consisting of carbon fibers and metal fibers.

Examples of the shape of the conductive auxiliary agent include a fibrous shape, an acicular shape, a tubular shape, a dumbbell shape, a disk shape, and an oval spherical shape. Among the above examples, the shape of the conductive auxiliary agent is preferably a fibrous shape from the viewpoint of an improvement in electron conductivity of the active material.

The aspect ratio of the conductive auxiliary agent is preferably 1.5 or more, and more preferably 5 or more. In a case where the aspect ratio of the conductive auxiliary agent is 1.5 or more, the electron conductivity of the electrode active material can be improved, and thus the output characteristics of the battery can be improved.

The aspect ratio of the conductive auxiliary agent is preferably 10,000 or less, more preferably 5,000 or less, and particularly preferably 1,000 or less. Furthermore, the aspect ratio of the conductive auxiliary agent is preferably 500 or less, more preferably 300 or less, and particularly preferably 100 or less. In a case where the aspect ratio of the conductive auxiliary agent is 10,000 or less, the dispersibility of the conductive auxiliary agent can be improved, and a short circuit due to the conductive auxiliary agent penetrating a formed body for an electrode can be efficiently prevented.

The aspect ratio of the conductive auxiliary agent is measured by the following method. SEM images of three optional visual fields taken at 1,000 to 3,000-fold observation magnification using a scanning electron microscope (SEM) (for example, XL30 manufactured by Koninklijke Philips N.V.) are converted to bitmap (BMP) files. Images of 50 particles of the conductive auxiliary agent are imported using image analysis software (for example, "A-ZOKUN" that is an integrated application of IP-1000PC manufactured by Asahi Engineering Co., Ltd.). A maximum length and a minimum length of each of the particles of the conductive auxiliary agent are read in a state in which the particles of the conductive auxiliary agent are observed without being overlapped. The "maximum length of the conductive auxiliary agent" means the length (that is, major axis length) of a line segment having the maximum length among line segments from a certain point to another point on the outer circumference of the conductive auxiliary agent particle. The "minimum length of the conductive auxiliary agent" means the length (that is, minor axis length) of a line segment having the minimum length among line segments from a certain point to another point on the outer circumference of the conductive auxiliary agent particle, which are orthogonal to the line segment having the maximum value. An average (A) of 40 points excluding upper 5 points and lower 5 points among the maximum lengths (major axis lengths) of the 50 particles of the conductive auxiliary agent is obtained. Next, an average (B) of 40 points excluding upper 5 points and lower 5 points among the minimum lengths (minor axis lengths) of the 50 particles of the conductive auxiliary agent is obtained. The aspect ratio of the conductive auxiliary agent is calculated by dividing the average (A) by the average (B).

The minor axis length of the conductive auxiliary agent is preferably 10 µm or less, more preferably 8 µm or less, and particularly preferably 5 µm or less.

The minor axis length of the conductive auxiliary agent is preferably 1 nm or more, more preferably 3 nm or more, and particularly preferably 5 nm or more.

The minor axis length of the conductive auxiliary agent is the minimum length of each of 50 particles of the conductive auxiliary agent calculated in the method of measuring the aspect ratio of the conductive auxiliary agent.

The average minor axis length of the conductive auxiliary agent is preferably 8 µm or less, more preferably 5 µm or less, and particularly preferably 3 µm or less.

The average minor axis length of the conductive auxiliary agent is preferably 1 nm or more, more preferably 2 nm or more, and particularly preferably 3 nm or more.

The average minor axis length of the conductive auxiliary agent is an average of the minor axis lengths of the particles of the conductive auxiliary agent, excluding upper 10% (that is, upper 5 points) and lower 10% (that is, lower 5 points) of the minimum lengths (minor axis lengths) of 50 particles of the conductive auxiliary agent calculated in the method of measuring the aspect ratio of the conductive auxiliary agent.

The electrode material may contain one kind of conductive auxiliary agent alone, or two or more kinds of conductive auxiliary agents.

In a case where the electrode material contains a conductive auxiliary agent, the content of the conductive auxiliary agent is preferably more than 0 mass % and 10 mass % or less, more preferably 0.5 mass % to 8 mass %, and particularly preferably 1 mass % to 7 mass % with respect to the total solid content mass of the electrode material from the viewpoint of an improvement in electron conductivity of the active material.

(Lithium Salt) The electrode material preferably contains a lithium salt from the viewpoint of an improvement in battery performance. The lithium salt is not limited, and known lithium salts can be used.

As the lithium salt, the lithium salts described in paragraphs 0082 to 0085 of JP2015-088486A are preferable.

The electrode material may contain one kind of lithium salt alone, or two or more kinds of lithium salts.

In a case where the electrode material contains a lithium salt, the content of the lithium salt is preferably 0.1 mass % to 10 mass % with respect to the total solid content mass of the electrode material.

(Dispersant)

The electrode material preferably contains a dispersant. In a case where the electrode material contains a dispersant, it is possible to suppress the aggregation in a case where the concentration of any one of the electrode active material or the inorganic solid electrolyte is high.

The dispersant is not limited, and known dispersants can be used. The dispersant is preferably a compound consisting of low molecules of a molecular weight of 200 or more and less than 3,000 or oligomers, and having at least one functional group selected from the following functional group (I) and an alkyl group having 8 or more carbon atoms or an aryl group having 10 or more carbon atoms in the same molecule.

The functional group (I) includes at least one functional group selected from the group consisting of an acidic group, a group having a basic nitrogen atom, a (meth)acryloyl group, a (meth)acrylamide group, an alkoxysilyl group, an epoxy group, an oxetanyl group, an isocyanate group, a cyano group, a sulfanyl group, and a hydroxy group, and is preferably a group consisting of an acidic group, a group having a basic nitrogen atom, an alkoxysilyl group, a cyano group, a sulfanyl group, and a hydroxy group, and more preferably a group consisting of a carboxy group, a sulfonic acid group, a cyano group, an amino group, and a hydroxy group.

The electrode material may contain one kind of dispersant alone, or two or more kinds of dispersants.

In a case where the electrode material contains a dispersant, the content of the dispersant is preferably 0.2 mass % to 10 mass %, and more preferably 0.5 mass % to 5 mass % with respect to the total solid content mass of the electrode material from the viewpoint that both the prevention of aggregation and the battery performance are achieved.

(Liquid Component)

The electrode material may contain a liquid component. Examples of the liquid component include an electrolytic solution.

The electrolytic solution is not limited, and known electrolytic solutions can be used. Examples of the electrolytic solution include an electrolytic solution containing an electrolyte and a solvent. Specific examples of the electrolytic solution include an electrolytic solution containing a lithium salt compound as an electrolyte and a carbonate compound as a solvent.

Examples of the lithium salt compound include lithium hexafluorophosphate. The electrolytic solution may contain one kind of lithium salt compound alone, or two or more kinds of lithium salt compounds.

Examples of the carbonate compound include ethyl methyl carbonate, ethylene carbonate, and propylene carbonate. The electrolytic solution may contain one kind of carbonate compound alone, or two or more kinds of carbonate compounds.

Examples of the electrolyte contained in the electrolytic solution include the materials described in the above section "Inorganic Solid Electrolyte".

As a component of the electrolytic solution, for example, an ionic liquid may be used. The ionic liquid may be used as an electrolyte or a solvent.

The content of the electrolytic solution in the electrode material is preferably 30 mass % or less, more preferably 20 mass % or less, and particularly preferably 15 mass % or less with respect to the total mass of the electrode material. In a case where the content of the electrolytic solution in the electrode material is 30 mass % or less, it is possible to suppress the oozing of the electrolytic solution during the forming of the electrode material.

The lower limit of the content of the electrolytic solution in the electrode material is preferably 0.01 mass % or more, and more preferably 0.1 mass % or more with respect to the total mass of the electrode material from the viewpoint of an improvement in battery performance.

The electrode material may contain, as a liquid component, a solvent other than the solvent contained as a component of the electrolytic solution (hereinafter, also simply referred to as "solvent"). Examples of the solvent include alcohol compound solvents, ether compound solvents, amide compound solvents, amino compound solvents, ketone compound solvents, aromatic compound solvents, aliphatic compound solvents, and nitrile compound solvents.

Examples of the alcohol compound solvents include methyl alcohol, ethyl alcohol, 1-propyl alcohol, 2-propyl alcohol, 2-butanol, ethylene glycol, propylene glycol, glycerin, 1,6-hexanediol, cyclohexanediol, sorbitol, xylitol, 2-methyl-2,4-pentanediol, 1,3-butanediol, and 1,4-butanediol.

Examples of the ether compound solvents include alkylene glycol alkyl ether (for example, ethylene glycol monomethyl ether, ethylene glycol monobutyl ether, diethylene glycol, dipropylene glycol, diethylene glycol monomethyl ether, triethylene glycol, polyethylene glycol, propylene glycol monomethyl ether, dipropylene glycol monomethyl ether, tripropylene glycol monomethyl ether, diethylene glycol monobutyl ether, and diethylene glycol monobutyl ether), dimethyl ether, diethyl ether, diisopropyl ether, dibutyl ether, tetrahydrofuran, and dioxane.

Examples of the amide compound solvents include N,N-dimethylformamide, 1-methyl-2-pyrrolidone, 2-pyrrolidinone, 1,3-dimethyl-2-imidazolidinone, F-caprolactam, formamide, N-methylformamide, acetamide, N-methylacetamide, N,N-dimethylacetamide, N-methylpropanamide, and hexamethylphosphoric triamide.

Examples of the amino compound solvents include triethylamine, diisopropylethylamine, and tributylamine.

Examples of the ketone compound solvents include acetone, methyl ethyl ketone, methyl isobutyl ketone, and cyclohexanone.

Examples of the aromatic compound solvents include benzene, toluene, and xylene.

Examples of the aliphatic compound solvents include hexane, heptane, octane, and decane.

Examples of the nitrile compound solvents include acetonitrile, propionitrile, and isobutyronitrile.

The solvent is preferably at least one solvent selected from the group consisting of a nitrile compound solvent, an aromatic compound solvent, and an aliphatic compound solvent, more preferably at least one solvent selected from the group consisting of isobutyronitrile, toluene, and heptane, and particularly preferably at least one solvent selected from the group consisting of toluene and heptane.

The boiling point of the solvent is preferably 50° C. or higher, and more preferably 70° C. or higher at normal pressure (that is, 1 atm). The upper limit of the boiling point of the solvent is preferably 250° C. or lower, and more preferably 220° C. or lower at normal pressure (that is, 1 atm).

The electrode material may contain one kind of solvent alone, or two or more kinds of solvents.

The content of the solvent (including the solvent contained as a component of the electrolytic solution, and this is the same in this paragraph) in the electrode material is preferably 30 mass % or less, more preferably 20 mass % or less, and particularly preferably 15 mass % or less with respect to the total mass of the electrode material. In a case where the content of the solvent in the electrode material is 30 mass % or less, it is possible to suppress the deterioration of battery performance, and it is possible to suppress the oozing of the solvent during the forming of the electrode material. The lower limit of the content of the solvent in the electrode material is not limited, and may be 0 mass % or more, or more than 0 mass %.

The content of the liquid component in the electrode material is preferably 30 mass % or less, more preferably 20 mass % or less, and particularly preferably 15 mass % or less with respect to the total mass of the electrode material. In a case where the content of the liquid component in the electrode material is 30 mass % or less, it is possible to suppress the oozing of the liquid component during the forming of the electrode material. In addition, in a case where the liquid component contains a solvent, it is possible to suppress the deterioration of battery performance. The lower limit of the content of the liquid component in the electrode material is not limited, and may be 0 mass % or more, or more than 0 mass %.

As the electrode material, for example, the following materials can also be used in addition to the above materials.

(1) The granulated body described in paragraphs 0029 to 0037 of JP2017-104784A
(2) The positive electrode mixture paint described in paragraph 0054 of JP2016-059870A
(3) The composite particles described in paragraphs 0017 to 0070 of JP2016-027573A
(4) The composite particles described in paragraphs 0020 to 0033 of JP6402200B
(5) The electrode composition described in paragraphs 0040 to 0065 of JP2019-046765A
(6) The materials (for example, active material, positive electrode slurry, and negative electrode slurry) described in paragraphs 0080 to 0114 of JP2017-054703A
(7) The powder described in JP2014-198293A
(8) The active material, binder, and composite particles described in paragraphs 0024 to 0025, 0028, and 0030 to 0032 of JP2016-062654A (Electrode Material Preparation Method)

The electrode material can be prepared by, for example, mixing the electrode active material with the above-described optional components other than the electrode active material.

Examples of the mixing method include a method using a ball mill, a beads mill, a planetary mixer, a blade mixer, a roll mill, a kneader, or a disk mill.

[Electrode Material Forming Step]

The method of manufacturing a formed body for an electrode according to the present disclosure preferably includes a step of forming the electrode material (that is, electrode material forming step) after the electrode material jetting step.

In a case where the method of manufacturing a formed body for an electrode according to the present disclosure includes the forming step, the density of the electrode material can be increased, and the density can be made uniform.

In the electrode material forming step, as shown in FIGS. 1 and 2, the electrode material 20 supplied onto the support 10 is pressurized by the pressurizing roll 50 to form the electrode material.

The unit pressurizing the electrode material (also referred to as a pressurizing unit) is not limited to a roll member such as a pressurizing roll, and examples thereof include a pressing device.

In the electrode material forming step, the electrode material is preferably formed by bringing the electrode material and the pressurizing unit into direct or indirect contact with each other. Here, "bringing . . . into indirect contact with each other" means bringing the electrode material and the forming member into contact with each other via another member (for example, the above-described second support) placed between the electrode material and the forming member.

In a case where the electrode material is pressurized, the pressure is preferably 1 MPa to 1 GPa, more preferably 5 MPa to 500 MPa, and particularly preferably 10 MPa to 300 MPa.

In the electrode material forming step, the electrode material may be pressurized in a stepwise manner using a plurality of pressurizing units (for example, pressurizing rolls). By pressurizing the electrode material in a stepwise manner using a plurality of pressurizing units, the density distribution of the electrode material can be made more uniform.

For example, using a plurality of pressurizing roll pairs in which a gap between the rolls is adjusted to be narrower in a stepwise manner, the electrode material can be pressurized in a stepwise manner.

In the electrode material forming step, the pressurizing unit and the electrode material (specifically, the first support on which the electrode material is supplied) are preferably relatively moved.

In the present disclosure, "relatively moving the pressurizing unit and the electrode material" includes moving the pressurizing unit with respect to the electrode material in one direction, moving the electrode material with respect to the pressurizing unit in one direction, and respectively moving the pressurizing unit and the electrode material in one direction, and moving the electrode material with respect to the pressurizing unit in one direction is preferable.

The unit that moves the electrode material (specifically, the first support on which the electrode material is supplied) is not limited, and known transport units can be used.

Examples thereof include a belt conveyor, a linear motion guide, and a cross roller table.

In the electrode material forming step, for example, the electrode material heated at 30° C. to 250° C. may be pressurized from the viewpoint of an improvement in formability.

[Other Steps]

The method of manufacturing a formed body for an electrode according to the present disclosure may include the following other steps.

For example, the method may include a step of placing a third support on the electrode material supplied onto the first support (also referred to as a third support placing step) after the electrode material jetting step and before the electrode material forming step.

In addition, a step of transferring the electrode material onto the third support (also referred to as a transfer step) before or after the electrode material forming step may be included.

[Third Support Placing Step]

In the third support placing step, the third support is placed on the electrode material supplied onto the first support after the electrode material jetting step and before the electrode material forming step.

The third support placing step is preferably employed in an aspect in which in the above-described electrode material jetting step, the first support is a release material and the second support is not used.

By performing the third support placing step, it is possible to suppress the scattering, contamination, and the like of the electrode material, and a formed body for an electrode that is excellent in in-plane uniformity of a mass distribution is easily obtained.

The third support is preferably a collector.

The collector used as the third support is the same as that of the second support, and preferable aspects are also the same.

[Transfer Step]

In the transfer step, after the laminate in which the electrode material is sandwiched between the first support and the third support is formed through the third support placing step, the laminate is inverted upside down to transfer the electrode material onto the third support.

By performing the transfer step, the electrode material is transferred onto the third support as a collector, and a formed body for an electrode with a collector is obtained.

<<Formed Body for Electrode>>

A formed body for an electrode obtained by the method of manufacturing a formed body for an electrode according to the present disclosure is excellent in in-plane uniformity of a density, and can thus be used as various electrodes.

The formed body for an electrode is preferably a formed body for an electrode for an all-solid state secondary battery.

The shape of the formed body for an electrode is not limited, and may be appropriately determined depending on the intended use. The shape of the formed body for an electrode is preferably a flat plate shape.

The average thickness of the formed body for an electrode is preferably 0.01 mm to 2 mm, more preferably 0.05 mm to 1.5 mm, and particularly preferably 0.1 mm to 1 mm from the viewpoint of an improvement in battery performance (for example, discharge capacity and output characteristics).

The average thickness of the formed body for an electrode is measured in the same manner as the average thickness of the first support.

EXAMPLES

Hereinafter, the present disclosure will be described in detail with examples, but is not limited thereto.

<Preparation of Sulfide-Based Inorganic Solid Electrolyte (Li—P—S-Based Glass)>

A sulfide-based inorganic solid electrolyte was prepared with reference to T. Ohtomo, A. Hayashi, M. Tatsumisago, Y Tsuchida, S. Hama, K. Kawamoto, Journal of Power Sources, 233, (2013), pp. 231 to 235, and A. Hayashi, S. Hama, H. Morimoto, M. Tatsumisago, T. Minami, Chem. Lett., (2001), pp 872 to 873.

Specifically, in a glove box under an argon atmosphere (dew point: −70° C.), 2.42 g of lithium sulfide ($Li_2S$, manufactured by Sigma-Aldrich Inc., purity: >99.98%) and 3.9 g of diphosphorus pentasulfide ($P_2S_5$, manufactured by Sigma-Aldrich Inc., purity: >99%) were respectively weighed, and then the lithium sulfide and the diphosphorus pentasulfide were mixed for 5 minutes using an agate mortar. The molar ratio of $Li_2S$ to $P_2S_5$ ($Li_2S:P_2S_5$) was 75:25.

66 zirconia beads having a diameter of 5 mm were put in a 45 mL zirconia container (manufactured by Fritsch GmbH). Then, the entire amount of the mixture of the lithium sulfide and the diphosphorus pentasulfide was put therein, and then the container was completely sealed under an argon atmosphere. The container was mounted on a planetary ball mill P-7 (trade name) manufactured by Fritsch GmbH, and mechanical milling was performed for 20 hours at a temperature of 25° C. and a rotation speed of 510 rpm (revolutions per minute) to obtain 6.2 g of a yellow powder of a sulfide-based solid electrolyte (Li—P—S-based glass). The above steps were repeated 10 times, and 62 g of a sulfide-based solid electrolyte was obtained.

Example 1

[Preparation of Electrode Material (P-1) for Positive Electrode]

180 zirconia beads having a diameter of 5 mm were put in a 45 mL zirconia container (manufactured by Fritsch GmbH), and then 3.0 g of the prepared Li—P—S-based glass was put therein. The container was mounted on a planetary ball mill P-7 manufactured by Fritsch GmbH, and mixing was performed for 2 hours at a temperature of 25° C. and a rotation speed of 300 rpm. Next, 6.8 g of LCO ($LiCoO_2$, manufactured by Nippon Chemical Industrial CO., LTD.) as an active material and Li-100 (0.2 g) manufactured by Denka Company as a conductive auxiliary agent were put in the container. Then, the container was mounted on the planetary ball mill P-7, and mixing was performed for 10 minutes at a temperature of 25° C. and a rotation speed of 100 rpm to obtain a particulate electrode material (P-1) for a positive electrode. The above steps were repeated 50 times, and a required amount of an electrode material for a positive electrode was obtained.

[Preparation of Hopper]

A surface layer was formed on an inner peripheral surface of a hopper (produced using stainless steel) and an inner peripheral surface of a discharge port by the following method.

First, an undercoat layer was formed on the inner peripheral surface of the hopper and the inner peripheral surface of the discharge port by the method described above, and then fluororesin coating was performed using NF-004 (main material: FEP) manufactured by NIPPON FUSSO CO., LTD. to form a surface layer.

A contact angle of the formed surface layer (that is, contact surface $F_B$) with water, measured by the method described above, was 75°, and an arithmetic average roughness Ra of the surface layer, measured by the method described above, was 5 μm.

[Preparation of Regulating Roll]

A surface layer was formed on an outer peripheral surface of a stainless steel roll member (manufactured by MISUMI Group Inc.) having an outer diameter of 10 mm by the following method.

First, an undercoat layer was formed on the outer peripheral surface of the roll member by the method described above, and then fluororesin coating was performed using NF-004 (main material: FEP) manufactured by NIPPON FUSSO CO., LTD. to form a surface layer.

A contact angle of the formed surface layer (that is, contact surface $F_B$) with water, measured by the method described above, was 75°, and an arithmetic average roughness Ra of the surface layer, measured by the method described above, was 5 μm.

[Production of Positive Electrode Sheet]

Using the electrode material jetting step shown in FIG. 1, a positive electrode sheet was produced as follows.

The electrode material (P-1) for a positive electrode was put in four screw feeders (powder measuring feeders (screw type) manufactured by AS ONE Corporation, PSF-100SA) placed in parallel. The hopper having four entrances was provided in a lower portion of the screw feeder, and through the hopper, the electrode material (P-1) for a positive electrode was jetted onto a support (release paper: SP-8E ivory manufactured by NIHON-LABEL, contact angle of surface $F_A$ with water: 60°, average thickness: 20 μm, width: 100 mm, length: 200 mm) that was being moved in the direction of the arrow A.

In this case, the electrode material is supplied onto the support in a region of 80 mm in a width direction.

Next, the electrode material supplied onto the support was leveled using the regulating roll.

Through the above procedure, a powder sheet (positive electrode sheet) having a length of 10 cm or more in a longitudinal direction in which a mass distribution amount (target value) of the electrode material was 100 mg/cm² was obtained.

Examples 2 to 4

Powder sheets (positive electrode sheets) were produced in the same manner as in Example 1, except that NF-004 manufactured by NIPPON FUSSO CO., LTD., used to form the surface layers of the hopper and the regulating roll, was changed to NF-015, A coat, or NF-004EC manufactured by NIPPON FUSSO CO., LTD. as described in Table 1.

Regarding the surface layers of the hopper and the regulating roll, the contact angle with water and the arithmetic average roughness Ra were measured by the methods described above. The results are shown in Table 1.

Example 5

A powder sheet (positive electrode sheet) was produced in the same manner as in Example 1, except that the arithmetic average roughness Ra of each of the surface layers of the hopper and the regulating roll was 1 μm.

The arithmetic average roughness Ra of the surface layer was adjusted by forming the surface layer in the same manner as in Example 1, except that the inner peripheral surface of the hopper and the outer peripheral surface of the regulating roll in a state in which no surface layer was formed were subjected to superoll processing (processing by a mirror finishing tool that crushes a metal surface by a roller and smoothly finishes the metal surface).

Example 6

[Preparation of Long Support]

A surface layer was formed on one side of a collector (aluminum foil having a thickness of 20 m) having a length of 200 mm by the following method.

First, the surface layer was formed by performing silicone resin coating on an outer peripheral surface of the collector.

A contact angle of the formed surface layer (that is, contact surface $F_B$) with water, measured by the method described above, was 85°, and an arithmetic average roughness Ra of the surface layer, measured by the method described above, was 3 μm.

Using the electrode material jetting step shown in FIG. 2, a positive electrode sheet was produced as follows.

The electrode material (P-1) for a positive electrode was put in four screw feeders (powder measuring feeders (screw type) manufactured by AS ONE Corporation, PSF-100SA) placed in parallel. The hopper having four entrances was provided in a lower portion of the screw feeder, and through the hopper, the electrode material (P-1) for a positive electrode was jetted onto a support (release paper: SP-8E ivory manufactured by NIHON-LABEL, contact angle of surface $F_A$ with water: 60°, average thickness: 20 μm, width: 100 mm, length: 200 mm) that was being moved in the direction of the arrow A.

As shown in FIG. 2, the long support was used that is moved while being brought into contact with the electrode material (P-1) for a positive electrode discharged from the discharge port of the hopper along a part of the inner peripheral surface of the hopper and a part of the discharge port of the hopper. In addition, the long support was used so that the surface on which the surface layer was formed was in contact with the electrode material (P-1) for a positive electrode.

In this case, the electrode material is supplied onto the support in a region of 80 mm in a width direction.

Next, the electrode material supplied onto the support was leveled using a regulating roll (a stainless steel roll member (manufactured by MISUMI Group Inc.) having no surface layer and having an outer diameter of 10 mm).

Through the above procedure, a powder sheet (positive electrode sheet) having a length of 10 cm or more in a longitudinal direction in which a mass distribution amount (target value) of the electrode material was 100 mg/cm² was obtained.

Example 7

A powder sheet was produced by the same procedure as in Example 1, except that an electrode material (P-2) for a positive electrode prepared by kneading the electrode material (P-1) for a positive electrode and an electrolytic solution was used. The content of the electrolytic solution was 30 mass % with respect to the total mass of the electrode material (P-2) for a positive electrode. A lithium hexafluorophosphate solution (1.0 M $LiPF_6$ in EC/EMC=50/50 (v/v)) manufactured by Sigma-Aldrich Inc. was used as an electrolytic solution. "EC" means ethylene carbonate. "EMC" means ethyl methyl carbonate.

Example 8

A powder sheet was produced by the same procedure as in Example 6, except that the electrode material (P-2) for a positive electrode was used.

Comparative Example 1

A powder sheet (positive electrode sheet) was produced in the same manner as in Example 1, except that a hopper and a regulating roll in a state in which no surface layer was formed were used.

Comparative Example 2

A powder sheet (positive electrode sheet) was produced in the same manner as in Example 6, except that a hopper and a long support in a state in which no surface layer was formed were used.

Comparative Example 3

A powder sheet (positive electrode sheet) was produced in the same manner as in Example 7, except that a hopper and a regulating roll in a state in which no surface layer was formed were used.

Comparative Example 4

A powder sheet (positive electrode sheet) was produced in the same manner as in Example 1, except that the support (release paper) was changed to a support (commercially available aluminum foil having a surface layer formed by performing silicone resin coating on the foil, contact angle of surface $F_A$ with water: 80°, average thickness: 20 μm, width: 200 mm, length: 200 mm), and the electrode material (P-1) for a positive electrode was supplied onto the surface layer.

<Measurement and Evaluation>
[Measurement of Wall Friction Angles θ1 and θ2]

Wall friction angles θ1 and θ2 in each of the examples and the comparative examples were measured by the methods described above.

The results are shown in Table 1.

[Evaluation of Uniformity of Mass Distribution]

Test pieces having a size of 1 $cm^2$ were cut out from 80 places ([8 places in width direction]×[10 places in length direction]) in the powder sheet. A frame-shaped Thomson blade in which the area inside the frame per frame was adjusted to 1 $cm^2$ was used to cut out the test piece. Next, the mass of each of the test pieces cut out from the total 80 places in the powder sheet was measured. From the mass of the test pieces, a mass standard deviation (a) of the whole powder sheet was obtained, and uniformity of the mass distribution was evaluated according to the following criteria. Of the following criteria, A, B, C, and D were accepted. The results are shown in Table 1.
(Criteria)
A: $0\% \leq \sigma < 1\%$
B: $1\% \leq \sigma < 2\%$
C: $2\% \leq \sigma < 3\%$
D: $3\% \leq \sigma < 5\%$
E: $5\% \leq \sigma < 10\%$
F: $10\% \leq \sigma$

[Evaluation of Productivity]

In a case where 10 powder sheets were produced, productivity was evaluated according to the following criteria based on an operating rate (r) calculated according to the following expression. In normal operation, it takes 30 seconds to produce one powder sheet. In a case where the operation can be normally performed, 10 powder sheets can be produced in 300 seconds. Therefore, "target production time" in the following expression was 300 seconds. Of the following criteria, A, B, and C were accepted. The results are shown in Table 1.

Expression: [Operating Rate (r)]=[Target Production time]/[Actual Production Time]
(Criteria)
A: $0.9 < r \leq 1.0$
B: $0.8 < r \leq 0.9$
C: $0.6 < r \leq 0.8$
D: $0.4 < r \leq 0.6$
E: $r \leq 0.4$

TABLE 1

| | | Electrode Material | Surface or Surface Layer of Hopper | | | | Surface or Surface Layer of Regulating Roll | | | | Second Support | | | | | First Support | | | Evaluation | |
|---|---|---|---|---|---|---|---|---|---|---|---|---|---|---|---|---|---|---|---|---|
| | | | Material Used to Form Surface Layer | Contact Angle [°] | Ra [μm] | θ1 [°] | Material Used to Form Surface Layer | Contact Angle [°] | Ra [μm] | θ1 [°] | Used or Not Used | Material Used to Form Surface Layer | Contact Angle [°] | Ra [μm] | θ1 [°] | Kind | Contact Angle [°] | θ2 [°] | Mass Distribution | Productivity |
| Examples | 1 | (P-1) | NF-004 | 75 | 5 | 13 | NF-004 | 75 | 5 | 13 | not used | — | — | — | — | release paper | 60 | 18 | D | C |
| | 2 | (P-1) | NF-015 | 80 | 5 | 12 | NF-015 | 80 | 5 | 12 | not used | — | — | — | — | release paper | 60 | 18 | C | C |
| | 3 | (P-1) | Aμcoat | 90 | 5 | 11 | Aμcoat | 90 | 5 | 11 | not used | — | — | — | — | release paper | 60 | 18 | B | B |
| | 4 | (P-1) | NF-004EC | 75 | 5 | 13 | NF-004EC | 75 | 5 | 13 | not used | — | — | — | — | release paper | 60 | 18 | D | C |

TABLE 1-continued

| | | Electrode Material | Surface or Surface Layer of Hopper | | | | Surface or Surface Layer of Regulating Roll | | | | Second Support | | | | | First Support | | | Evaluation | |
|---|---|---|---|---|---|---|---|---|---|---|---|---|---|---|---|---|---|---|---|---|
| | | | Material Used to Form Surface Layer | Contact Angle [°] | Ra [μm] | θ1 [°] | Material Used to Form Surface Layer | Contact Angle [°] | Ra [μm] | θ1 [°] | Used or Not Used | Material Used to Form Surface Layer | Contact Angle [°] | Ra [μm] | θ1 [°] | Kind | Contact Angle [°] | θ2 [°] | Mass Distribution | Productivity |
| | 5 | (P-1) | NF-004 | 75 | 1 | 13 | NF-004 | 75 | 1 | 13 | not used | — | — | — | — | release paper | 60 | 18 | C | C |
| | 6 | (P-1) | NF-004 | 75 | 5 | 11 | — | 55 | 5 | (20) | used | silicone resin | 85 | 3 | 10 | release paper | 60 | 18 | A | A |
| | 7 | (P-2) | NF-004 | 75 | 5 | 14 | NF-004 | 75 | 5 | 14 | not used | — | — | — | — | release paper | 60 | 18 | D | D |
| | 8 | (P-2) | NF-004 | 75 | 5 | 14 | — | 55 | 5 | 22 | used | silicone resin | 85 | 3 | 11 | release paper | 60 | 18 | A | A |
| Comparative Examples | 1 | (P-1) | — | 70 | 5 | 25 | — | 70 | 5 | (25) | not used | — | — | — | — | release paper | 60 | 18 | E | E |
| | 2 | (P-1) | — | 70 | 5 | 25 | — | 55 | 5 | (20) | used | silicone resin | 85 | 3 | 10 | release paper | 60 | 18 | E | D |
| | 3 | (P-2) | — | 70 | 5 | 30 | — | 70 | 5 | 30 | not used | — | — | — | — | release paper | 60 | 18 | F | E |
| | 4 | (P-1) | NF-004 | 75 | 5 | 13 | NF-004 | 75 | 5 | 13 | not used | — | — | — | — | Si resin-coated aluminum foil | 80 | 14 | E | D |

From Table 1, it has been found that Examples 1 to 8 are higher in uniformity of the mass distribution than Comparative Examples 1 to 4.

EXPLANATION OF REFERENCES

10: first support
20: electrode material
30: hopper (example of storage member, example of contact member)
32: discharge port of hopper (example of outlet)
40: regulating roll (example of contact member)
50: pressurizing roll
60: second support (example of contact member)
A: direction in which first support is transported The entire disclosure of JP2019-149870 filed on Aug. 19, 2019 is incorporated herein by reference. All literatures, patent applications, and technical standards described herein are incorporated herein by reference to the same extent as if each literature, patent application, or technical standard is specifically and individually indicated as being incorporated by reference.

What is claimed is:

1. A method of manufacturing a formed body for an electrode comprising:
   jetting an electrode material containing an electrode active material from an outlet toward a surface $F_A$ of a first support while relatively moving the outlet jetting the electrode material and the first support in a plane direction of the first support,
   wherein in the jetting, a contact member having a contact surface $F_B$ that is brought into contact with the electrode material is used, and
   in a case where a wall friction angle between the contact surface $F_B$ of the contact member and the electrode material is denoted by $\theta 1$, and a wall friction angle between the surface $F_A$ of the first support and the electrode material is denoted by $\theta 2$, the following relationships (1) and (2) are satisfied, $$1° \leq \theta 1 < 15° \tag{1}$$

$$15° \leq \theta 2. \tag{2}$$

2. The method of manufacturing a formed body for an electrode according to claim 1,
   wherein the wall friction angles $\theta 1$ and $\theta 2$ satisfy the following relationship (3), $$1° \leq \theta 2 - \theta 1 \leq 60°. \tag{3}$$

3. The method of manufacturing a formed body for an electrode according to claim 1,
   wherein the wall friction angle $\theta 2$ satisfies the following relationship (2'), $$15° \leq \theta 2 \leq 60°. \tag{2'}$$

4. The method of manufacturing a formed body for an electrode according to claim 1,
   wherein the contact member is a storage member that has a discharge port as the outlet and is capable of storing the electrode material, and an inner peripheral surface of the discharge port is the contact surface $F_B$ of the contact member.

5. The method of manufacturing a formed body for an electrode according to claim 1,
   wherein the contact member is a roll member, and an outer peripheral surface of the roll member is the contact surface $F_B$ of the contact member.

6. The method of manufacturing a formed body for an electrode according to claim 1,
   wherein the contact member is a long second support that constitutes a part of the outlet and is moved while being brought into contact with the jetted electrode material, and a contact surface of the second support that is brought into contact with the electrode material is the contact surface $F_B$ of the contact member.

7. The method of manufacturing a formed body for an electrode according to claim 1,
> wherein the contact surface $F_B$ of the contact member has a contact angle of 75° or more with water.

8. The method of manufacturing a formed body for an electrode according to claim 1,
> wherein the surface $F_A$ of the first support has a contact angle of 30° or more and less than 75° with water.

9. The method of manufacturing a formed body for an electrode according to claim 1,
> wherein the contact surface $F_B$ of the contact member has a surface layer containing at least one of a fluorine atom or a silicon atom.

10. The method of manufacturing a formed body for an electrode according to claim 9,
> wherein the surface layer further contains an antistatic agent.

11. The method of manufacturing a formed body for an electrode according to claim 1,
> wherein the contact surface $F_B$ of the contact member has an arithmetic average roughness Ra of 10 μm or less.

12. The method of manufacturing a formed body for an electrode according to claim 1,
> wherein the first support is a release material.

* * * * *